(12) United States Patent
Aoki et al.

(10) Patent No.: US 12,440,174 B2
(45) Date of Patent: Oct. 14, 2025

(54) X-RAY COMPUTED TOMOGRAPHY APPARATUS AND STATE-CHANGE CONTROL METHOD

(71) Applicant: CANON MEDICAL SYSTEMS CORPORATION, Otawara (JP)

(72) Inventors: Kei Aoki, Nasushiobara (JP); Yohei Matsuzawa, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 376 days.

(21) Appl. No.: 17/817,692

(22) Filed: Aug. 5, 2022

(65) Prior Publication Data

US 2023/0073617 A1 Mar. 9, 2023

(30) Foreign Application Priority Data

Sep. 7, 2021 (JP) ................. 2021-145195

(51) Int. Cl.
*A61B 6/03* (2006.01)
*A61B 5/00* (2006.01)
*A61B 6/00* (2024.01)

(52) U.S. Cl.
CPC ............ *A61B 6/03* (2013.01); *A61B 5/0033* (2013.01); *A61B 6/4447* (2013.01)

(58) Field of Classification Search
CPC ........... A61B 6/035; A61B 6/03; A61B 6/032; A61B 6/0407; A61B 5/0033; A61B 6/4447; A61B 34/10; A61B 6/0478; A61B 6/447; A61B 6/4476; A61B 6/5223; A61B 6/54; A61B 6/586; A61B 6/589; A61B 6/0487;

(Continued)

(56) References Cited

U.S. PATENT DOCUMENTS 3,670,163 A * 6/1972 Lajus ..................... A61B 6/512
378/178
4,649,560 A * 3/1987 Grady .................. A61B 6/4441
378/197

(Continued)

FOREIGN PATENT DOCUMENTS

CN 111938688 A 11/2020
JP 9-56711 3/1997

(Continued)

OTHER PUBLICATIONS

Office Action mailed Sep. 2, 2025, in Japanese Application No. 2021-145195 filed Sep. 7, 2021 (citing document Nos. 15-21 therein).

*Primary Examiner* — Irakli Kiknadze
(74) *Attorney, Agent, or Firm* — Oblon, McClelland, Maier & Neustadt, L.L.P.

(57) ABSTRACT

An X-ray computed tomography apparatus includes a gantry, a support member, a mount frame, and a support stand. The gantry includes an imaging system to image a subject. The support member supports a support plate that supports the subject in imaging. The support member and the gantry are mounted on a mount frame such that a relative positional relationship between the support member and the gantry is changeable in a longitudinal direction of the support plate. The support stand supports the mount frame in a manner that the mount frame is changeable in posture at least in-between a vertical direction and a horizontal direction.

12 Claims, 17 Drawing Sheets

(58) Field of Classification Search
CPC ... A61B 6/4482; A61B 6/4435; A61B 6/5205; A61B 6/10; A61B 6/5276; A61B 6/02; A61B 6/4464; A61B 6/4429; A61B 6/08; A61B 6/04; A61B 6/469; A61B 6/488; A61B 6/0464; A61B 6/5264; A61B 6/102; A61B 6/4488; A61B 6/037; A61B 2034/105; A61B 2034/107; A61B 6/4208; A61B 6/4291; A61B 6/4452; A61B 6/461; A61B 6/467; A61B 6/487; A61B 6/06; A61B 6/4014; A61B 6/4035; A61B 6/56; A61B 6/545; A61B 6/4085; A61B 6/504; A61B 6/508; A61B 6/027; A61B 6/503; A61B 6/542; A61B 6/4233; A61B 6/4007; A61B 6/4405; A61B 6/025; A61B 6/501; A61B 6/4266; A61B 6/0442; A61B 6/4275; A61B 6/0492; A61B 6/481; H05G 1/02; G01N 23/046; F16C 2316/10; F16C 2226/60; F16C 35/067; F16C 2300/14; G01T 1/2985; H01L 25/00; H01L 2924/0002; H01L 2924/00
USPC .......................................................... 378/4, 17
See application file for complete search history.

(56) References Cited

U.S. PATENT DOCUMENTS

| | | | | |
|---|---|---|---|---|
| 4,653,083 A | * | 3/1987 | Rossi | A61B 6/4441 378/197 |
| 4,928,283 A | * | 5/1990 | Gordon | A61B 6/032 250/363.05 |
| 4,961,208 A | * | 10/1990 | Okada | A61B 6/0478 250/363.04 |
| 5,027,378 A | * | 6/1991 | Fujii | G01N 23/046 378/10 |
| 6,831,961 B1 | * | 12/2004 | Tybinkowski | A61B 6/032 250/363.04 |
| 7,003,070 B1 | * | 2/2006 | Chen | A61B 6/04 378/20 |
| 7,796,730 B2 | * | 9/2010 | Marash | A61B 6/04 378/68 |
| 8,223,920 B2 | * | 7/2012 | Amelia | A61N 5/1049 378/65 |
| 8,348,506 B2 | * | 1/2013 | Yorkston | A61B 6/4085 378/4 |
| 9,808,211 B2 | * | 11/2017 | Yorkston | A61B 6/4007 |
| 10,307,120 B1 | * | 6/2019 | Thomas | A61B 6/0478 |
| 2007/0025526 A1 | * | 2/2007 | Izuhara | A61B 6/4405 378/209 |
| 2008/0205584 A1 | * | 8/2008 | Sukovic | A61B 6/032 378/11 |
| 2015/0208998 A1 | * | 7/2015 | Stoutenburgh | A61B 6/032 378/11 |
| 2017/0105689 A1 | | 4/2017 | Hori | |
| 2018/0353143 A1 | * | 12/2018 | Gregerson | A61B 6/4452 |

FOREIGN PATENT DOCUMENTS

| | | |
|---|---|---|
| JP | 2001-161671 | 6/2001 |
| JP | 2007-44484 | 2/2007 |
| JP | 2007-167408 | 7/2007 |
| JP | 2015-198769 A | 11/2015 |
| JP | 2017-074361 A | 4/2017 |
| JP | 2017-077322 A | 4/2017 |
| JP | 2017-080304 A | 5/2017 |
| JP | 2017-86160 | 5/2017 |
| WO | WO-2008142695 A1 * 11/2008 | ............ A61B 6/032 |
| WO | WO 2020/245502 A1 | 12/2020 |

* cited by examiner

X-RAY COMPUTED TOMOGRAPHY APPARATUS AND STATE-CHANGE CONTROL METHOD

CROSS-REFERENCE TO RELATED APPLICATIONS

This application is based upon and claims the benefit of priority from Japanese Patent Application No. 2021-145195, filed on Sep. 7, 2021; the entire contents of which are incorporated herein by reference.

FIELD

Embodiments described herein relate generally to an X-ray computed tomography apparatus and a state-change control method.

BACKGROUND

Traditionally, X-ray computed tomography (CT) apparatuses (hereinafter, X-ray CT apparatus) capable of imaging a subject in a decubitus state or an upright state are known. Such an X-ray CT apparatus includes a mechanism for rotating a gantry body equipped with an imaging system between a decubitus imaging position where the subject is to be imaged in the decubitus state (hereinafter, referred to as decubitus imaging) and an upright imaging position where the subject is to be imaged in the upright state (hereinafter, referred to as upright imaging).

Due to the rotation of the gantry body in transitioning from the state of the decubitus imaging to the state of the upright imaging or from the state of the upright imaging to the state of the decubitus imaging, images obtained by decubitus imaging and upright imaging may not represent the positional relationship of objects accurately.

DETAILED DESCRIPTION

Figure 1:
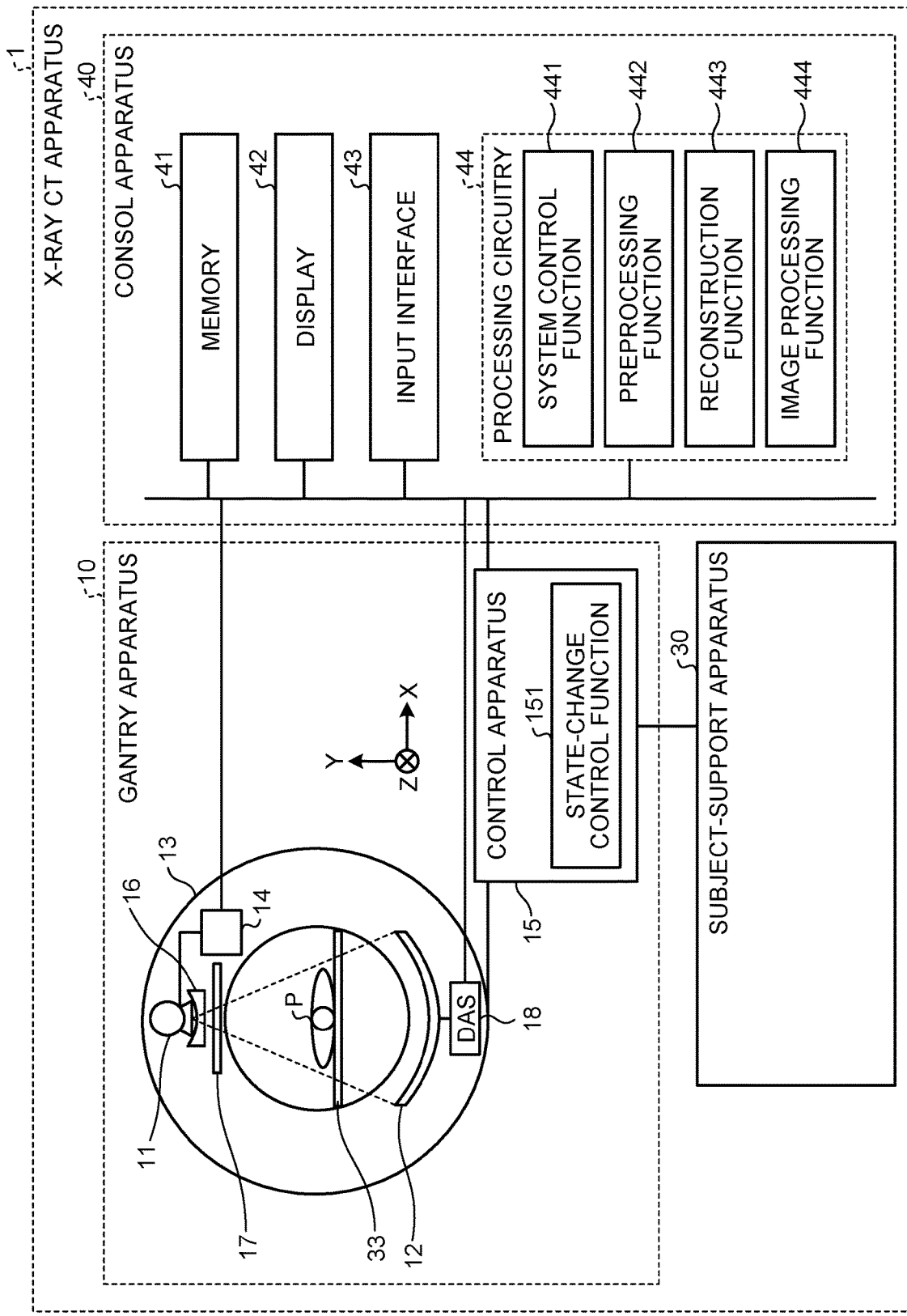
FIG. 1 illustrates an exemplary structure of an X-ray CT apparatus according to an embodiment.

According to an embodiment to be described below, an X-ray computed tomography apparatus includes a gantry, a support member, a mount frame, and a support stand. The gantry includes an imaging system to image a subject. The support member supports a support plate that supports the subject in imaging. The support member and the gantry are mounted on a mount frame such that a relative positional relationship between the support member and the gantry is changeable in a longitudinal direction of the support plate. The support stand supports the mount frame in a manner that the mount frame is changeable in posture at least in-between a vertical direction and a horizontal direction.

Hereinafter, embodiments of an X-ray computed tomography (CT) apparatus (hereinafter, X-ray CT apparatus) and a state-change control method will be described with reference to the accompanying drawings. In the following embodiments, parts, portions, elements, or functions denoted by the same reference numerals are considered to perform same or similar operation, and an overlapping explanation thereof will be omitted when appropriate.

Embodiment

FIG. 1 illustrates an exemplary structure of an X-ray CT apparatus 1 according to an embodiment. As illustrated in FIG. 1, the X-ray CT apparatus 1 includes a gantry apparatus (also referred to as gantry) 10, a subject-support apparatus 30 for supporting a subject, and a console apparatus 40. In the present embodiment the X-ray CT apparatus 1 is structured to be able to change a mount apparatus (as later described) in posture in-between upright imaging state that a subject can be imaged in an upright or seated position and decubitus imaging state that a subject can be imaged in a decubitus position.

In the following, in the upright imaging state and the decubitus imaging state the rotation axis of a rotational frame 13 is defined as a Z-axis, and two axes orthogonal to the Z-axis and to each other are defined as an X-axis and a Y-axis. The X-axis, Y-axis, and Z-axis in FIG. 1 correspond to three orthogonal axes in the decubitus imaging state. As illustrated in FIG. 1, the Y-axis corresponds to a vertical direction. The X-axis in FIG. 1 corresponds to a direction orthogonal to the Y-axis and the Z-axis. The subject-support apparatus 30 includes a support plate 33 on which a subject P is to be laid in the decubitus imaging state, as illustrated in FIG. 1. The support plate 33 functions as a table top while the subject-support apparatus 30 functions as a couch.

The gantry apparatus 10 and the subject-support apparatus 30 operate in accordance with an operator's manipulation via the console apparatus 40 or via an operational unit included in the gantry apparatus 10 or the subject-support apparatus 30. The gantry apparatus 10, the subject-support apparatus 30, and the console apparatus 40 are connected to one another in a wired or wireless manner to be mutually communicable.

The gantry apparatus 10 includes an imaging system that images the subject P. As an example, the gantry apparatus 10 includes an imaging system that irradiates the subject P with X-rays and detects X-rays having transmitted the subject P to acquire projection data from X-ray detection data. The gantry apparatus 10 is provided with an opening in which the support plate 33 is partially disposed. Specifically, the gantry apparatus 10 includes an X-ray tube 11 that generates X-rays, an X-ray detector 12, a rotational frame 13, an X-ray high-voltage apparatus 14, a control apparatus 15, a wedge 16, a collimator 17, and a data acquisition system (DAS) 18.

The X-ray tube 11 is a vacuum tube to be applied with a high voltage and supplied with a filament current from the X-ray high-voltage apparatus 14 to generate X-rays by emitting thermoelectrons from a negative pole (filament) to a positive pole (target). The X-rays are generated as a result of collision between the thermoelectrons and the target. The X-rays are generated at the focal point of the X-ray tube 11, pass through an X-ray emission window thereof, are formed into, for example, a cone beam and adjusted in radiation quality via the wedge 16 and the collimator 17, and emitted to the subject P. Examples of the X-ray tube 11 include a rotating anode X-ray tube that generates X-rays by emitting thermoelectrons onto a rotating positive pole.

The X-ray detector 12 detects an X-ray emitted from the X-ray tube 11 and having passed through the subject P and outputs an electric signal corresponding to an amount of the X-ray to the DAS 18. The X-ray detector 12 includes, for example, multiple arrays of detection elements arranged along a single arc about the focal point of the X-ray tube 11 in a channel direction. The X-ray detector 12 has a structure that multiple detection element arrays are arranged in a slice direction (column or row direction), for example. Various types of the X-ray CT apparatus 1 are available, including a rotate/rotate-type (third generation CT) that the X-ray tube 11 and the X-ray detector 12 rotate together around the subject P, and a stationary/rotate-type (fourth generation CT) that a large number of X-ray detection elements are stationarily arranged in a ring form and the X-ray tube 11 alone rotates around the subject P. Any type is applicable to the present embodiment.

The X-ray detector 12 is exemplified by an indirect-conversion detector including a grid, a scintillator array, and an optical sensor array. The scintillator array includes multiple scintillators and each scintillator includes a scintillator crystal that outputs light having a quantity of photons corresponding to an amount of incident X-rays. The grid is disposed on the X-ray incident side of the scintillator array and includes an X-ray shield plate that functions to absorb scattered X-rays. The grid may be referred to as a collimator (one-dimensional collimator or two-dimensional collimator). The optical sensor array functions to convert an amount of light from the scintillators into an electric signal, and includes, for example, optical sensors such as photo multipliers (PMT). The X-ray detector 12 may be a direct-conversion detector including a semiconductor element that converts an incident X-ray into an electric signal. Alternatively, the X-ray detector 12 may be a photon counting X-ray detector. The X-ray detector 12 is an exemplary X-ray detector unit.

The rotational frame 13 is an annular frame that supports the X-ray tube 11 and the X-ray detector 12 in opposing positions to rotate the X-ray tube 11 and the X-ray detector 12 under the control of the control apparatus 15 as later described. The rotational frame 13 further includes the X-ray high-voltage apparatus 14 and the DAS 18 and supports them, in addition to the X-ray tube 11 and the X-ray detector 12. The rotational frame 13 is rotatably supported by a non-rotational part (e.g., a stationary frame although not illustrated in FIG. 1) of the gantry apparatus 10. The rotational mechanism includes a motor that generates rotative drive force and a bearing that transmits the rotative drive force to the rotational frame 13 to rotate, for example. The motor is disposed in, for example, the non-rotational part. The bearing is physically connected to the rotational frame 13 and the motor to rotate the rotational frame 13 in accordance with the rotative force of the motor.

The rotational frame 13 and the non-rotational part are each equipped with non-contact or contact communication circuitry which allows the units supported by the rotational frame 13 to communicate with the non-rotational part or external devices of the gantry apparatus 10. In the case of adopting a non-contact optical communication method, for instance, detection data generated by the DAS 18 is transmitted by optical communication from a transmitter with light emitting diodes (LED) included in the rotational frame 13 to a receiver with photodiodes included in the non-rotational part of the gantry apparatus 10, and then transferred by a transmitter from the non-rotational part to the console apparatus 40. Other examples of adoptable communication methods include a non-contact data transfer method such as capacitive-coupling or via radio waves and a contact data transfer method using a slip ring and an electrode brush. The rotational frame 13 is an exemplary rotational unit.

The X-ray high-voltage apparatus 14 includes a high voltage generator and an X-ray control device. The high voltage generator includes electric circuitry such as a transformer and a rectifier and functions to generate a high voltage to be applied to the X-ray tube 11 and a filament current to be supplied to the X-ray tube 11. The X-ray control device controls the output voltage in accordance with the X-rays emitted from the X-ray tube 11. The high-voltage generator may be of a transformer type or of an inverter type. Further, the X-ray high-voltage apparatus 14 may be disposed in the rotational frame 13 or in the stationary frame of the gantry apparatus 10. The X-ray high-voltage apparatus 14 is an exemplary X-ray high voltage unit.

The control apparatus 15 includes processing circuitry including a central processing unit (CPU), and a driving mechanism such as a motor and an actuator. The processing circuitry includes, for example, hardware resources including a processor such as a CPU or a micro processing unit (MPU), and a memory such as a read only memory (ROM) or a random access memory (RAM). The control apparatus 15 may also be implemented by an application specific integrated circuit (ASIC), a field programmable gate array (FPGA), another complex programmable logic device (CPLD), or a simple programmable logic device (SPLD). In accordance with an instruction from the console apparatus 40, the control apparatus 15 controls the X-ray high-voltage apparatus 14 and the DAS 18. The processor performs the control by reading and executing programs from the memory.

The control apparatus 15 functions to control the operation of the gantry apparatus 10 and the subject-support apparatus 30 in response to receipt of input signals from an input interface attached to the console apparatus 40 or the gantry apparatus 10. As an example, the control apparatus 15 controls the rotation of the rotational frame 13, the tilting of the gantry apparatus 10, and the operation of the subject-support apparatus 30 and the support plate 33 in response to receipt of input signals. The control apparatus 15 controls the gantry apparatus 10 to tilt by rotating the rotational frame 13 about an axis parallel to the direction of X-axis according to tilt-angle information input to an input interface attached to the gantry apparatus 10. Alternatively, the support plate 33 may be tilted in place of the gantry apparatus 10.

The control apparatus 15 includes a state-change control function 151 that controls various kinds of operation with respect to a mount apparatus (mount unit) on which the gantry apparatus 10 and the subject-support apparatus 30 are mounted. For example, the state-change control function 151 serves to change the mount apparatus in posture and orientation during a state transition period between an upright imaging state and a decubitus imaging state in accordance with an instruction from the console apparatus 40, the input interface attached to the gantry apparatus 10, or an external input device (not illustrated) such as a tablet or a PC. The programs for implementing the state-change control function 151 are stored in the memory of the control apparatus 15. The flow of processing by the mount apparatus, the subject-support apparatus 30, and the state-change control function 151 as well as the posture and orientation change of the mount apparatus will be described later. The state-change control function 151 may be implemented by a processing circuitry 44 of the console apparatus 40. The processing circuitry 44 that implements the state-change control function 151 is an exemplary state-change control unit.

The control apparatus 15 may be included in the gantry apparatus 10 or in the console apparatus 40. Further, in place of being stored in the memory, the programs to be executed by the control apparatus 15 may be directly embedded in the circuitry of the processor. In this case the processor implements the above-mentioned control by reading and executing the programs from the circuitry. The control apparatus 15 is an exemplary control unit which includes a state-change control unit.

The wedge 16 is a filter for adjusting the amount of X-rays emitted from the X-ray tube 11. Specifically, the wedge 16 serves to allow the X-rays emitted from the X-ray tube 11 to transmit therethrough for attenuation, so that the subject P is irradiated with the X-rays from the X-ray tube 11 in a predefined distribution. The wedge 16 is formed of aluminum and has a given target angle and a given thickness. Examples of the wedge 16 include a wedge filter and a bow-tie filter.

The collimator 17 includes a combination of lead plates forming slits, to converge the X-rays having transmitted the wedge 16 in an irradiation range, for example. The collimator 17 serves to shield a range of the X-rays to be unused in image generation in the X-ray irradiation range with respect to the subject P. By shielding the X-rays in this manner, the collimator 17 decreases the amount of scattered radiation of X-rays. The X-ray irradiation range corresponds to, for example, a region in the space between the X-ray tube 11 and the X-ray detector 12, the region through which the X-rays emitted from the focal point of the X-ray tube 11 pass on the way to the X-ray detector 12.

The DAS 18 includes an amplifier that amplifies the electric signals output from the respective X-ray detection elements of the X-ray detector 12, and an A/D converter that converts the electric signals into digital signals. Thus, the DAS 18 generates detection data. The DAS 18 transfers the detection data to the processing circuitry 44. The detection data may be referred to as source data. The DAS 18 is an exemplary data acquirer unit.

The console apparatus 40 includes a memory 41, a display 42, an input interface 43, and the processing circuitry 44. The processing circuitry 44, the memory 41, the display 42, and the input interface 43 perform data communications with one another via, for example, a bus. Although the console apparatus 40 and the gantry apparatus 10 are separately provided herein, the gantry apparatus 10 and/or the mount apparatus may include the console apparatus 40 or part of the elements of the console apparatus 40.

The memory 41 is implemented by, for example, a semiconductor memory element as a random access memory (RAM) or a flash memory, a hard disk, an optical disk, or a solid state drive (SSD). The memory 41 stores therein detection data output from the DAS 18, projection data generated by a preprocessing function 442, reconstructed medical image data by a reconstruction function 443, image data subjected to image processing by an image processing function 444, and imaging conditions for scanning of the subject P, for example. The medical image data is exemplified by three-dimensional CT image data and also referred to as reconstructed image data or volume data. The projection data and data before preprocessed by the preprocessing function 442 (i.e., detection data or source data) are collectively referred to as raw data. That is, raw data can be source data or projection data. The memory 41 further stores therein programs for executing a system control function 441, the preprocessing function 442, the reconstruction function 443, and the image processing function 444 to be implemented by the processing circuitry 44. The memory 41 is an exemplary storage unit.

The display 42 serves to display various kinds of information. For example, the display 42 outputs medical images (CT images) generated by the processing circuitry 44 and a graphical user interface (GUI) that allows the operator to perform various operational inputs as to image condition setting, reconstruction retry, and else. Examples of the display 42 include a liquid crystal display (LCD), a cathode ray tube (CRT) display, an organic electroluminescence display (OELD), a plasma display, or any other displays when appropriate. Alternatively, the display 42 may be included in the gantry apparatus 10. As an example, the display 42 may be a desktop type or may include a tablet terminal wirelessly communicable with the console apparatus 40 itself. The display 42 is an exemplary display unit.

The input interface 43 serves to receive various operational inputs from the operator to convert the operational inputs into electrical signals and output the electrical signals to the processing circuitry 44 and the control apparatus 15. As an example, the input interface 43 receives, from the operator, an imaging condition for acquiring projection data, a reconstruction condition for reconstructing CT image data, an image processing condition for post-processing CT image data, and else. The post-processing may be performed by either the console apparatus 40 or an external workstation or by both of the console apparatus 40 and an external workstation concurrently. Herein, the post-processing is defined as a concept for signifying processing with respect to images reconstructed by the reconstruction function 443. The post-processing includes a multi planar reconstruction (MPR) display of medical images and/or volume data rendering, by way of example.

In addition, the input interface 43 receives instructions as to the state change between the upright imaging state and the decubitus imaging state, and outputs the instructions to the control apparatus 15. Examples of the input interface 43 include a mouse, a keyboard, a trackball, a switch, a button, a joystick, a touchpad, and a touch panel display, as appropriate.

In the present embodiment the input interface 43 is not limited to the one including a physical operational component such as a mouse, a keyboard, a trackball, a switch, a button, a joystick, a touchpad, and a touch panel display. Other examples of the input interface 43 include electrical-signal processing circuitry that receives an electrical signal corresponding to an operational input from an external input device separated from the apparatus to output the electrical signal to the processing circuitry 44. Alternatively, the input interface 43 may be included in the gantry apparatus 10. The input interface 43 may include a tablet terminal wirelessly communicable with the console apparatus 40 itself. The input interface 43 is an exemplary input unit.

The processing circuitry 44 serves to control the X-ray CT apparatus 1 as a whole in accordance with electric signals representing operational inputs as output from the input interface 43, for example. The processing circuitry 44 includes, for example, hardware resources including a processor such as a CPU, an MPU, or a graphics processing unit (GPU) and a memory such as a ROM or a RAM. The processing circuitry 44 uses the processor that loads and executes programs on the memory, to implement the system control function 441, the preprocessing function 442, the reconstruction function 443, and the image processing function 444. The respective functions 441 to 444 may not be implemented by a single piece of processing circuitry. The processing circuitry 44 can be constituted of a combination of multiple independent processors, so that the processors can individually execute the programs to implement the respective functions 441 to 444.

The system control function 441 serves to control the respective functions of the processing circuitry 44 in response to receipt of operational inputs from the operator via the input interface 43. The system control function 441 reads and loads control programs from the memory 41 onto the memory inside the processing circuitry 44 to control the respective units of the X-ray CT apparatus 1 by the control programs. The system control function 441 is an exemplary system control unit.

The preprocessing function 442 serves to subject the detection data output from the DAS 18 to preprocessing including, for example, logarithm conversion, offset correction, sensitivity correction among the channels, and beam hardening correction, to generate data. Data before being preprocessed is referred to as source data while data after being preprocessed is referred to as projection data, as described above. The preprocessing function 442 is an exemplary preprocessing unit.

The reconstruction function 443 serves to perform reconstruction processing to raw data generated by scanning the subject P to reconstruct a medical image. Specifically, the reconstruction function 443 generates medical image data by performing reconstruction processing to the projection data generated by the preprocessing function 442 by filtered back projection (FBP), for example. The reconstruction processing includes various kinds of processing such as various corrections as scattering correction and beam hardening correction, and application of mathematical reconstruction functions to the reconstruction conditions. The reconstruction function 443 stores the reconstructed medical image data in the memory 41. The reconstruction function 443 is an exemplary reconstruction unit.

The image processing function 444 serves to convert medical image data into planar image data of any view or three-dimensional image data by a known method, in accordance with operational inputs received from the operator via the input interface 43. The reconstruction function 443 may directly generate three-dimensional image data. The image processing function 444 is an exemplary image processing unit.

Figure 2:
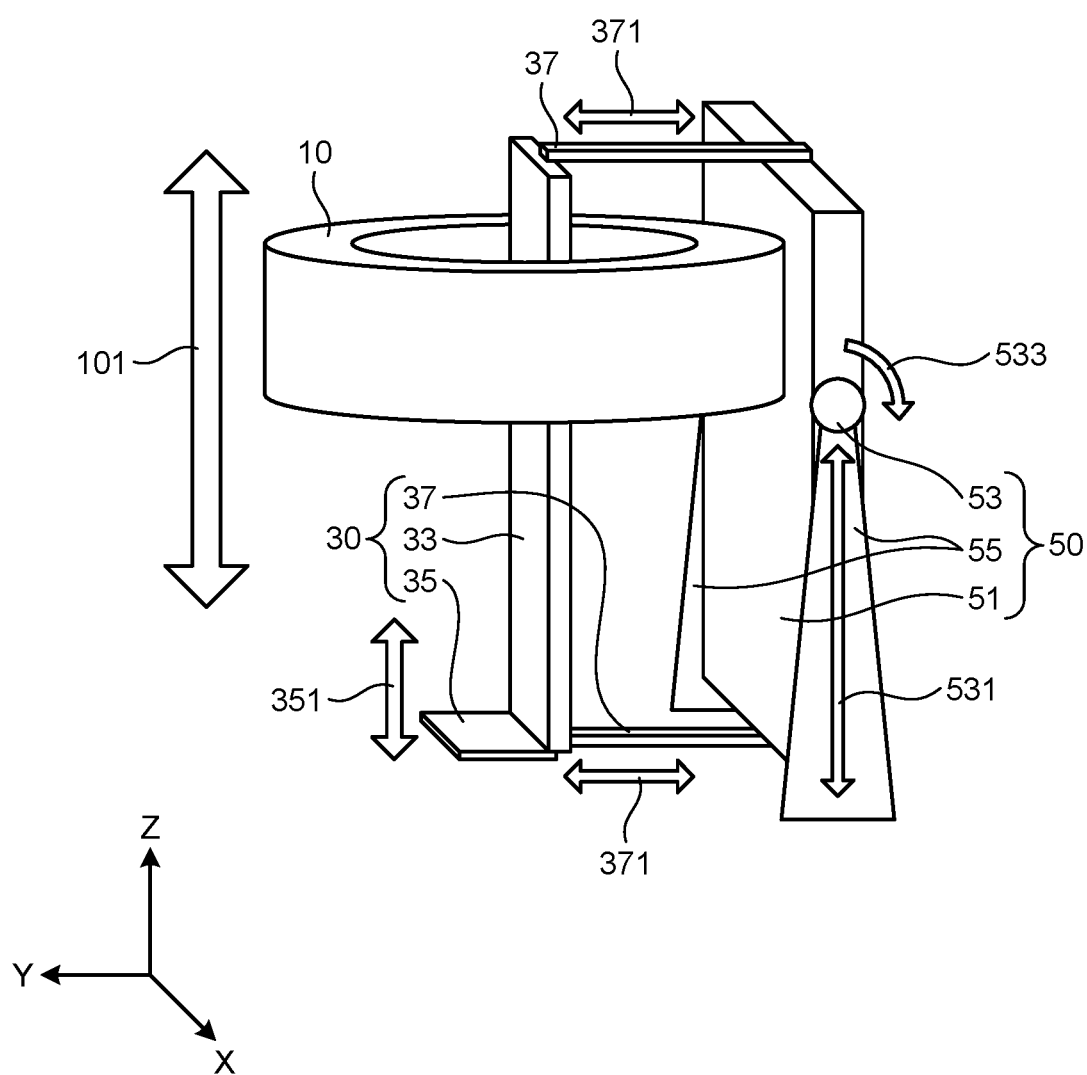
FIG. 2 illustrates an exemplary positional relationship between a gantry apparatus and a subject-support apparatus in upright imaging state according to an embodiment.

FIG. 2 illustrates an exemplary positional relationship between the gantry apparatus 10 and the subject-support apparatus 30 in upright imaging state. As illustrated in FIG. 2, the gantry apparatus 10 and the subject-support apparatus 30 are mounted on a mount apparatus 50. Specifically, the gantry apparatus 10 and the subject-support apparatus 30 are mounted on the mount apparatus 50 in an integrated manner. The subject-support apparatus 30 includes a support plate 33, a table 35, and a support member 37 as illustrated in FIG. 2. The mount apparatus 50 includes a mount frame 51, and a support stand 55 to be set on the floor.

The support plate 33 supports the subject in the upright state. Specifically, the support plate 33 functions as a plate (such as a backrest) for supporting the subject during imaging of the subject in the upright state (hereinafter, upright imaging). The support plate 33 movably supports the table 35 in the longitudinal direction of the support plate 33. A longitudinal direction 351 of the support plate 33 is, for example, along the Z-axis, as illustrated in FIG. 2.

The table 35 is disposed at one longitudinal end of the support plate 33 and movable in the longitudinal direction 351. The subject can place the sole or soles of the foot or feet on the table 35 in the upright state or the buttocks on the table 35 in the seated state. The subject undergoes upright imaging with the sole or soles of the foot or feet put on the table 35. The subject undergoes seated imaging with the buttocks put on the table 35. As an example, the table 35 is disposed on a block which is movable along a linear motion guide extending in the side face and/or the back face of the support plate 33 in the longitudinal direction. Driven by a motor under the control of the control apparatus 15 or the system control function 441, the block moves along the linear motion guide. In this manner the table 35 on which the subject is laid moves to a predefined imaging position in the direction of Z-axis, in preparation for upright imaging.

The support member 37 supports at least one of the longitudinal ends of the support plate 33 supporting the subject during imaging of the subject. The support member 37 supports the support plate 33 movably in at least one of two directions mutually orthogonal to the longitudinal direction of the support plate 33. The two directions are a direction perpendicular to the longitudinal direction and a rotation axis perpendicular to the vertical direction, and a direction parallel to the rotation axis. For example, the support member 37 movably supports the support plate 33 in the direction of Y-axis. FIG. 2 depicts the support member 37 as two pillars, however, the number of pillars is not limited to two and may be one or three or more. The support member 37 is equipped with a linear motion guide extending in the direction of Y-axis. One end of the support plate 33 is connected to a block movable along the linear motion guide. The block moves along the linear motion guide, driven by the motor under the control of the control apparatus 15 or the system control function 441.

The support plate 33 thus moves to the predefined imaging position in the direction 371 of Y-axis in preparation for upright imaging of the subject, as illustrated in FIG. 2. Additionally, a rotational mechanism such as a gear that tilts the support plate 33 about the rotation axis being Z-axis may be disposed between the block and the support plate 33. The support member 37 may be implemented by a motor-driven extendable bar, in place of the linear motion guide and the block in the support member 37.

The mount frame 51 has the support member 37 and the gantry apparatus 10 mounted thereon such that their relative positional relationship can be changed in the longitudinal direction of the support plate 33. The mount frame 51 functions as a base plate for the gantry apparatus 10 and the support member 37. Specifically, the mount frame 51 is equipped with a linear motion guide extending in a long axis (Z-axis) direction thereof. The gantry apparatus 10 is disposed on a block that is movable along the linear motion guide. Driven by the motor under the control of the state-change control function 151 of the control apparatus 15 or the system control function 441, the block moves along the linear motion guide. In this manner the mount frame 51 movably supports the gantry apparatus 10 in the long axis direction of the mount frame 51.

As such, the gantry apparatus 10 moves in the directions 101 along the Z-axis in preparation for and/or along with upright imaging of the subject, as illustrated in FIG. 2. One end of the support member 37 is connected to a long axial end of the mount frame 51. The relative positional relationship between the gantry apparatus 10 and the support plate 33 is changeable by moving the support plate 33 in the long axis (Y-axis) direction of the support member 37 and/or moving the gantry apparatus 10 in the long axis (Z-axis) direction of the mount frame 51.

The mount frame 51 is provided with a gyratory bearing (gyrator) 53 on the side face in a short axis (X-axis) direction. The gear (internal teeth) of the gyratory bearing 53 engages with a gear connected to the rotation axis of the motor via various kinds of gears that generate given torque. The internal teeth of the gyratory bearing 53 are rotated, driven by the motor under the control of the state-change control function 151 of the control apparatus 15. Thereby, the mount frame 51 rotates about the rotation axis being the X-axis as indicated by the arrow 533. That is, the gyratory bearing 53 functions as a fulcrum of the mount frame 51.

The support stand 55 supports the mount frame 51 in a manner that the mount frame 51 is changeable in posture at least in-between the vertical direction and the horizontal direction. The support stand 55 supports the mount frame 51 rotatably about the rotation axis (X-axis) perpendicular to the vertical direction, in accordance with the posture (upright, seated, or decubitus) of the subject during imaging, for example. Specifically, the support stand 55 rotatably supports the mount frame 51 via the gyratory bearing 53. Also, the support stand 55 supports the gyratory bearing 53 movably in the directions 531 along the Z-axis. Thus, the support stand 55 movably supports the mount frame 51 in the vertical direction. FIG. 2 depicts the support stand 55 as two pillars, however, the number of pillars are not limited to two and may be one or three or more. The support stand 55 includes a linear motion guide extending in the vertical direction and a block which is movable along the linear motion guide and to which the gyratory bearing 53 is attached. Driven by the motor under the control of the state-change control function 151 of the control apparatus 15, the block moves along the linear motion guide.

Figure 3:
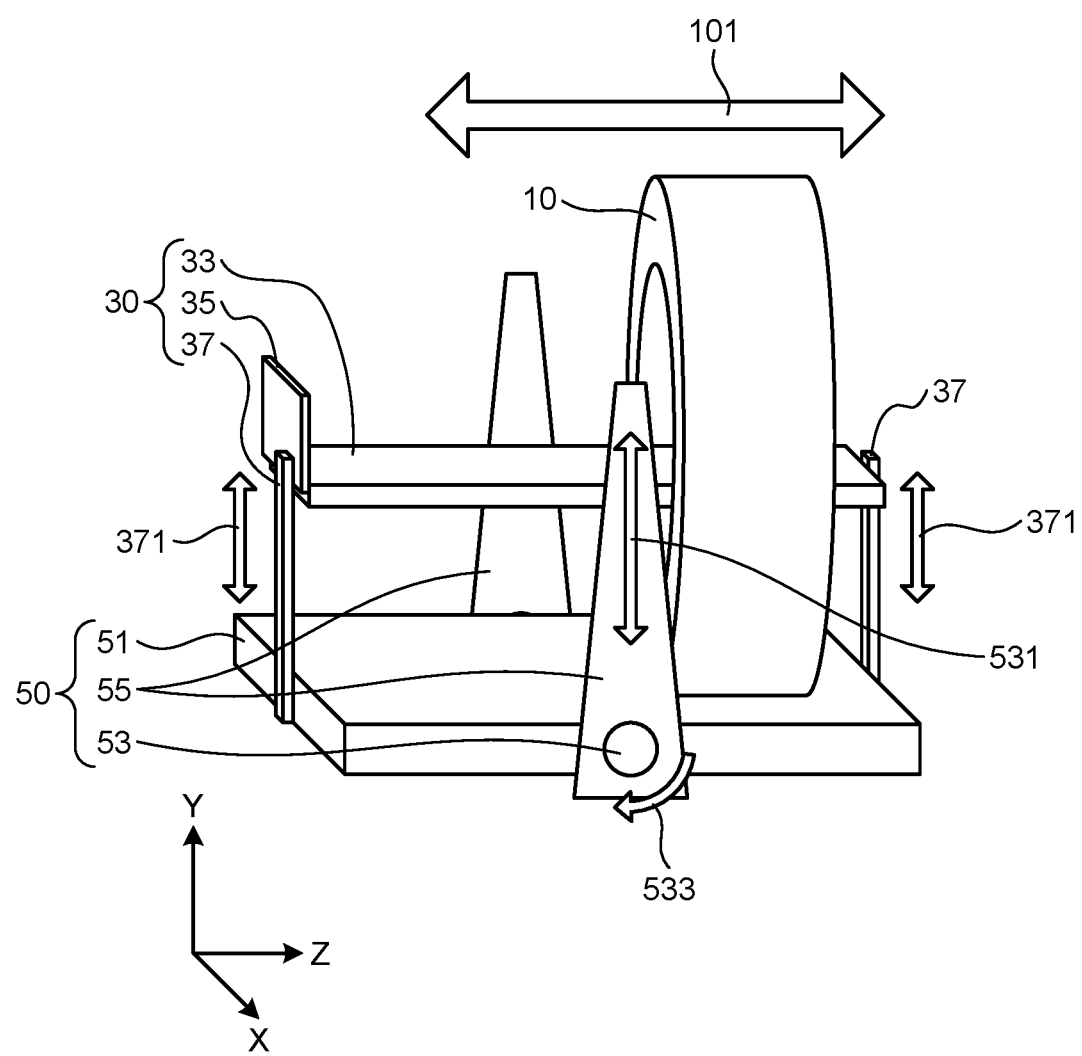
FIG. 3 an exemplary positional relationship between the gantry apparatus and the subject-support apparatus in decubitus imaging state according to an embodiment.

FIG. 3 illustrates an exemplary positional relationship between the gantry apparatus 10 and the subject-support apparatus 30 in decubitus imaging state. As illustrated in FIG. 2 and FIG. 3, the mount frame 51 moves and rotates by 90 degrees between the upright imaging state and the decubitus imaging state via the gyratory bearing 53. As illustrated in FIG. 2 and FIG. 3, the mount apparatus 50 changes in posture between the upright imaging state and the decubitus imaging state along with the motion and rotation of the mount frame 51. The above explanations of the mechanism for moving the gantry apparatus 10, the support plate 33, the table 35, and the mount frame 51 as well as the mechanism for rotating the mount frame 51 are merely exemplary. In place of the motor, any known device as an actuator may be used when appropriate. In FIG. 3 the two support members 37 at both ends of the support plate 33 may have different heights in the direction of Y-axis. In this case the gantry apparatus 10 can capture the subject in a tilting manner.

Figure 4:
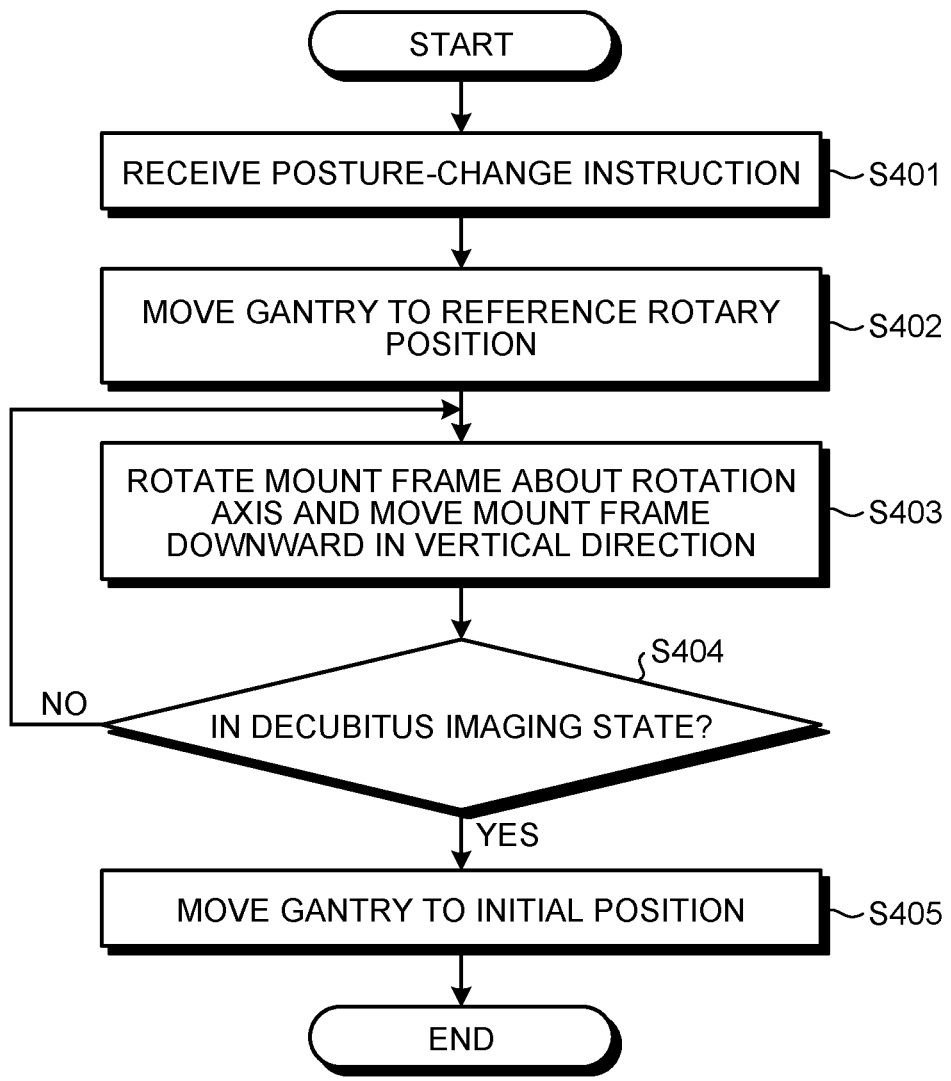
FIG. 4 is a flowchart illustrating a posture changing process of an embodiment by way of example.

With reference to FIG. 2 to FIG. 7, a process of changing the mount apparatus 50 in posture (hereinafter, posture changing process) from the upright imaging state in FIG. 2 to the decubitus imaging state in FIG. 3 in the X-ray CT apparatus 1 of the present embodiment structured above will be described. FIG. 4 is a flowchart illustrating an exemplary posture changing process.

Posture Changing Process

Step S401

An instruction for changing the mount apparatus 50 in posture (hereinafter, change instruction) is received via various kinds of input devices such as the input interface 43. Input of the change instruction may be implemented by pressing a "posture change" button provided on the support stand 55, for example. Immediately before receipt of the change instruction, the mount apparatus 50 is defined to take a posture as illustrated in FIG. 2.

Step S402

Figure 5:
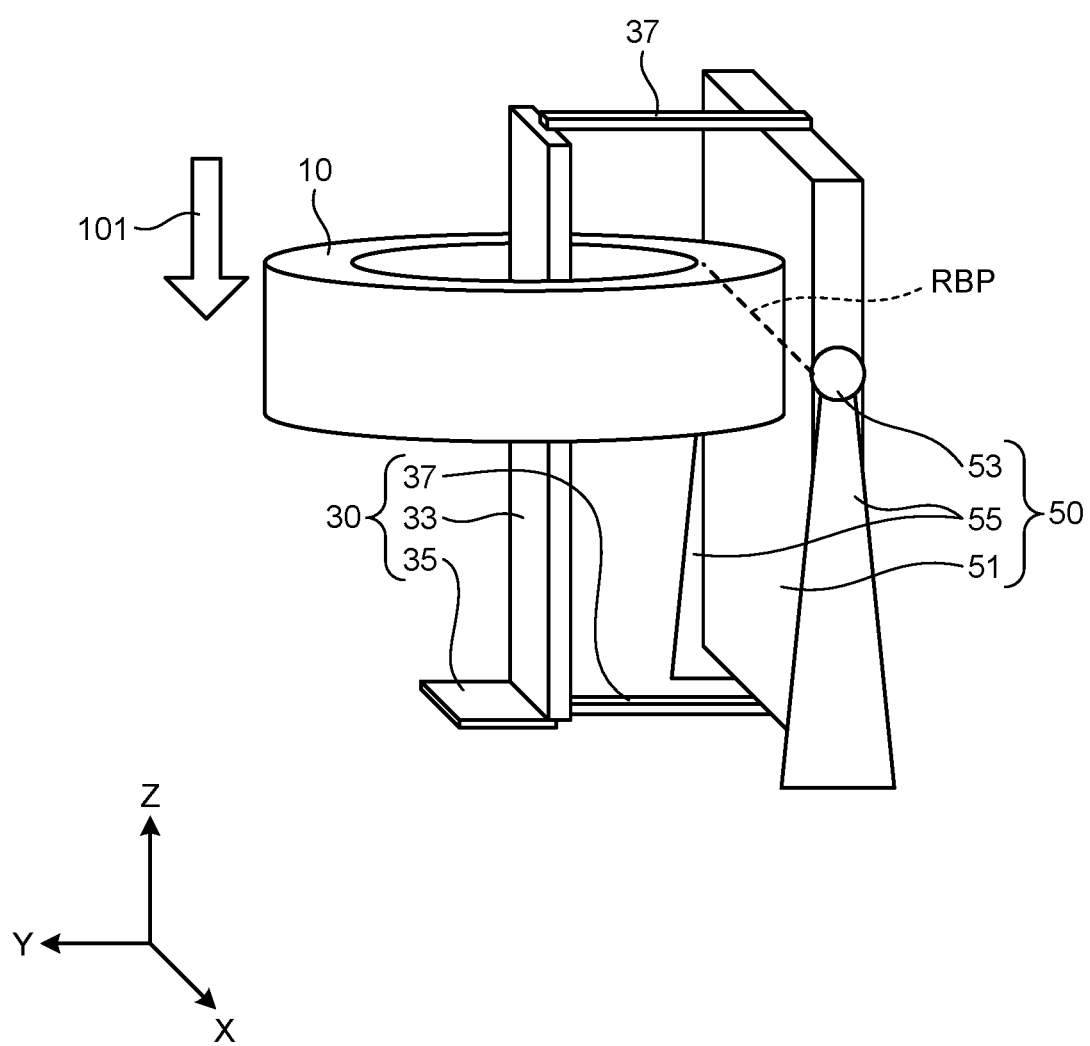
FIG. 5 illustrates an exemplary gantry apparatus when moved to a reference rotary position in an embodiment.

The control apparatus 15 uses the state-change control function 151 to move the gantry apparatus 10 to a reference rotary position. The reference rotary position refers to, for example, the position between the gyratory bearings 53 of the two support stands 55 in FIG. 2. That is, the state-change control function 151 moves the gantry apparatus 10 onto the rotation axis (e.g., X-axis) perpendicular to the vertical direction before rotating the mount frame 51. FIG. 5 illustrates an example of the gantry apparatus 10 moved to a reference rotary position RBP. The state-change control function 151 locks the block supporting the gantry apparatus 10, the block supporting the table 35, and the block supporting the support plate 33. By this locking the gantry apparatus 10, the table 35, and the support plate 33 are fixed to their respective support members.

The gantry apparatus 10, the table 35, and the support plate 33 are fixed, therefore, they become immobile. In response to the gantry apparatus 10's reaching the reference rotary position RBP, the state-change control function 151 releases the lock on the gyratory bearing 53 and the lock on the block supporting the gyratory bearing 53. This places the gyratory bearing 53 in a rotatable state and the block supporting the gyratory bearing 53 in a movable state along the linear motion guide.

Step S403

The control apparatus 15 uses the state-change control function 151 to rotate the mount frame 51 about the rotation axis (X-axis) perpendicular to the longitudinal direction of the support plate 33 and the vertical direction. Specifically, the state-change control function 151 rotates the mount frame 51 about the rotation axis (e.g., X-axis) perpendicular to the vertical direction in the state transition period from the upright imaging state that the subject can be imaged in the upright or seated position to the decubitus imaging state that the subject can be imaged in the decubitus position. The state-change control function 151 also moves the mount frame 51 in the vertical direction and stops moving the mount frame 51 before the end thereof opposing the floor contacts the floor surface.

Figure 6:
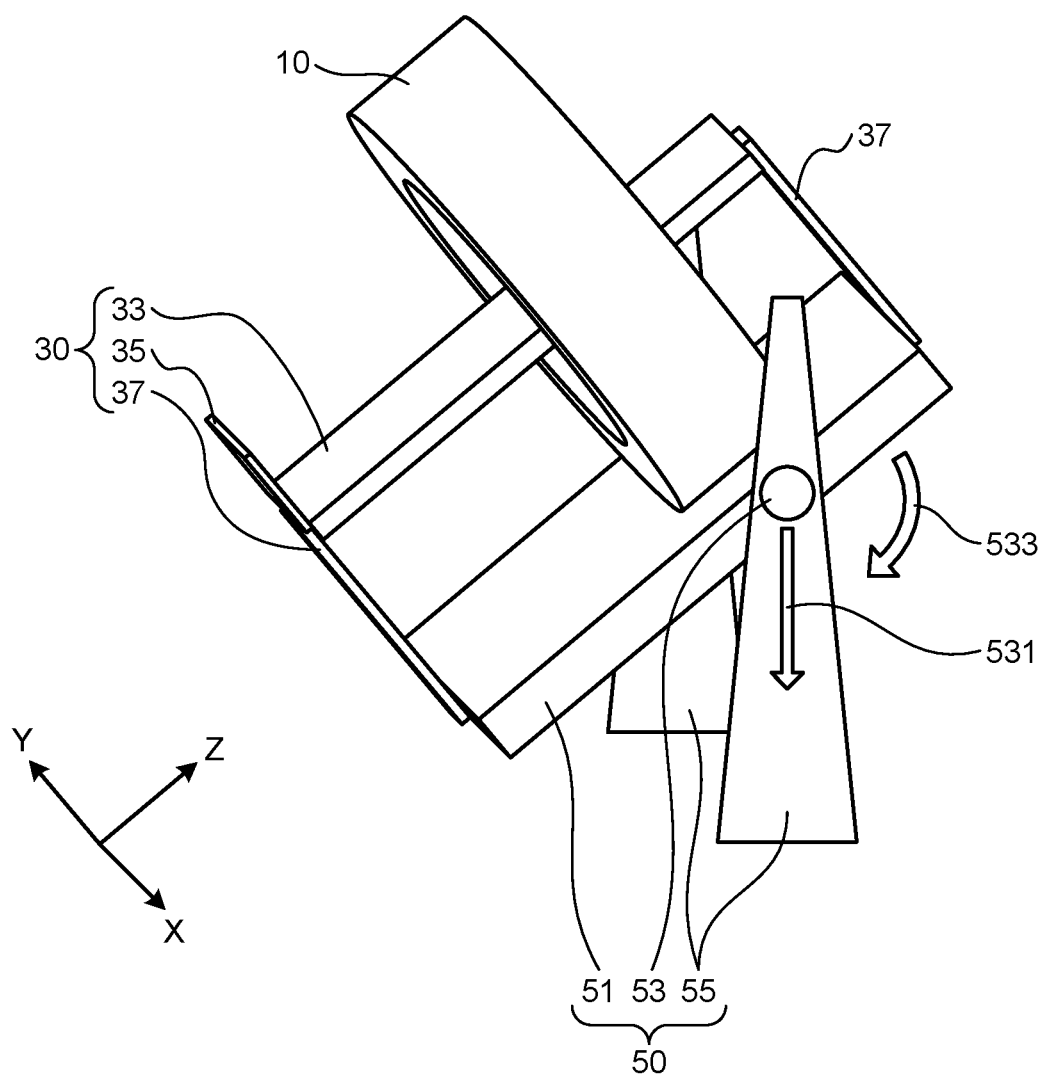
FIG. 6 illustrates a mount frame descending vertically while rotating about X-axis in an embodiment by way of example.

FIG. 6 depicts the mount frame 51 moving vertically downward while rotating about the X-axis, by way of example. As illustrated in FIG. 6, the state-change control function 151 moves the mount frame 51 vertically downward and rotates the mount frame 51 about the X-axis at the same time. Thus, the state-change control function 151 moves the mount frame 51 in the vertical direction along with its rotation. Alternatively, the state-change control function 151 may rotate the mount frame 51 by 90 degrees first and then move the 90-degree rotated mount frame 51 vertically downward.

Step S404

The control apparatus 15 uses the state-change control function 151 to determine whether or not the mount apparatus 50 is changed in posture for decubitus imaging state. Specifically, the state-change control function 151 determines whether or not the mount frame 51 has reached the floor. To determine whether the mount frame 51 has or has not reached the floor, for example, a contact sensor is attached to one surface of the mount frame 51 opposite the surface on which the gantry apparatus 10 and the subject-support apparatus 30 are mounted, to detect the floor. The determination is made from detection or non-detection of the floor with the contact sensor. The operation in step S403 is repeated unless the mount apparatus 50 is in the decubitus imaging state (No in step S404).

Figure 7:
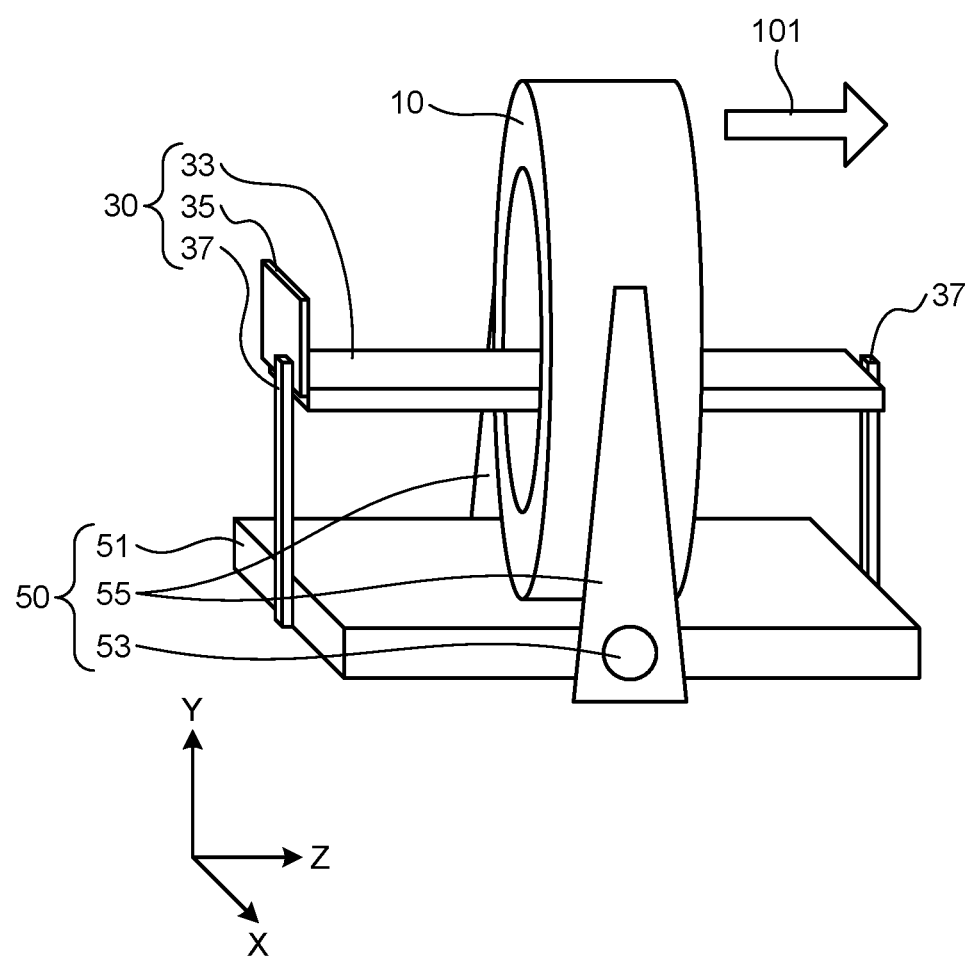
FIG. 7 illustrates a mount apparatus placed in a decubitus imaging state according to an embodiment by way of example.

After determining that the mount apparatus 50 is in the decubitus imaging state (Yes in step S404), the state-change control function 151 performs the operation in step S405. FIG. 7 depicts the mount apparatus 50 placed in the decubitus imaging state in step S404, by way of example. The state-change control function 151 locks the gear in the gyratory bearing 53 to lock the block supporting the gyratory bearing 53. This places the gyratory bearing 53 in a non-rotatable state and the block supporting the gyratory bearing 53 in an immobile state along the linear motion guide. By this locking, the rotation of the mount frame 51 via the gyratory bearing 53 and the motion of the block supporting the gyratory bearing 53 become unfeasible. Further, the state-change control function 151 releases the lock on the block supporting the gantry apparatus 10, the block supporting the table 35, and the block supporting the support plate 33. Thereby, the block supporting the gantry apparatus 10, the block supporting the table 35, and the block supporting the support plate 33 are placed in a movable state along the respective linear motion guides.

Step S405

The control apparatus 15 uses the state-change control function 151 to move the gantry apparatus 10 to an initial position for decubitus imaging. The initial position for decubitus imaging is defined as, for example, the position of the gantry apparatus 10 shown in FIG. 3. The gantry apparatus 10 is moved to the initial position for decubitus imaging in the direction indicated by the arrow 101 in FIG. 7. This operation completes the posture changing process.

In the posture changing process of the mount apparatus 50 from the decubitus imaging state in FIG. 3 to the upright imaging state in FIG. 2, the mount frame 51 is elevated in the direction of Z-axis and rotated about the rotation axis in step S403. In step S404 the control apparatus 15 uses the state-change control function 151 to determine whether the mount apparatus 50 is changed in posture for upright imaging state.

Specifically, the state-change control function 151 determines whether or not the long axis direction of the mount frame 51 coincides with the vertical direction. Whether the long axis direction of the mount frame 51 coincides with the vertical direction can be determined from, for example, an output of an angular sensor attached to the mount frame 51. Specifically, when the output from the angular sensor indicates that the long axis direction of the mount frame 51 does not match the vertical direction, i.e., the mount apparatus 50 is not in the upright imaging state, the state-change control function 151 repeatedly moves the mount frame 51 upward in the direction of Z-axis and rotates the mount frame 51 about the rotation axis. When determining from the output of the angular sensor that the mount apparatus 50 is in the upright imaging state, the state-change control function 151 ends the posture changing process of the mount apparatus 50 from the decubitus imaging state to the upright imaging state.

The X-ray CT apparatus 1 according to an embodiment as described above includes the gantry 10 including the imaging system to image the subject, the support member 37 that supports the subject in imaging the subject, the mount frame 51 on which the support member 37 and the gantry 10 are mounted in a manner that the relative positional relationship between the gantry 10 and the support plate 33 is changeable in the longitudinal direction of the support plate 33, and the support stand 55 that supports the mount frame 51 in a manner that the mount frame 51 is changeable in posture at least in-between the vertical direction and the horizontal direction. The mount frame 51 included in the X-ray CT apparatus 1 movably supports the gantry 10 in the long axis direction of the mount frame 51.

Further, the support member 37 included in the X-ray CT apparatus 1 supports at least one of the longitudinal ends of the support plate 33, and movably supports the support plate 33 in at least one of the direction perpendicular to the longitudinal direction of the support plate 33 and the rotation axis of the mount frame 51 and the direction parallel to the rotation axis of the mount frame 51. The support stand 55 included in the X-ray CT apparatus 1 movably supports the mount frame 51 in the vertical direction. The X-ray CT apparatus 1 further includes the table 35 on which the subject is to lay the sole or soles of the foot or feet in the upright state or lay the buttocks in the seated state. The support plate 33 included in the X-ray CT apparatus 1 movably supports the table 35 in the longitudinal direction of the support plate 33.

Moreover, the X-ray CT apparatus 1 rotates the mount frame 51 about the rotation axis perpendicular to the vertical direction in the state transition period which is from the upright imaging state that the subject can be imaged in the upright or seated position to the decubitus imaging state that the subject can be imaged in the decubitus position. Prior to rotating the mount frame 51, the X-ray CT apparatus 1 moves the gantry 10 onto the rotation axis perpendicular to the vertical direction. The support stand 55 included in the X-ray CT apparatus 1 movably supports the mount frame 51 in the vertical direction, and the X-ray CT apparatus 1 moves the mount frame 51 in the vertical direction along with the rotation of the mount frame 51.

As structured above, the X-ray CT apparatus 1 can rotate the gantry apparatus 10 and the subject-support apparatus 30 integrally about the same rotation axis (rotation axis of the gyratory bearing 53) in the state transition period between the upright imaging state and the decubitus imaging state. Thereby, the X-ray CT apparatus 1 can maintain the relative positional relationship between the gantry apparatus 10 and the subject-support apparatus 30 in the decubitus imaging state and in the upright imaging state. Because of this, the X-ray CT apparatus 1 can improve the accuracy of the relative positional relationship between the gantry apparatus 10 and the subject-support apparatus 30 in moving the subject to the imaging positions for decubitus imaging and upright imaging. As such, the X-ray CT apparatus 1 can provide upright imaging and decubitus imaging with third. That is, the X-ray CT apparatus 1 can image the subject in the decubitus state and in the upright state with the relative positional relationship between the gantry apparatus 10 and the subject-support apparatus 30 accurately maintained.

First Modification

A first modification differs from the embodiments in the structure of the mount apparatus 50. Specifically, the gantry apparatus 10 and the support member 37 integrated together are mounted on the mount frame 51. The support member 37 supports the support plate 33 movably in at least one of the longitudinal direction of the support plate 33 and two directions mutually orthogonal to the longitudinal direction. The mount apparatus 50 of the first modification will be described below with reference to FIG. 8 and FIG. 9.

Figure 8:
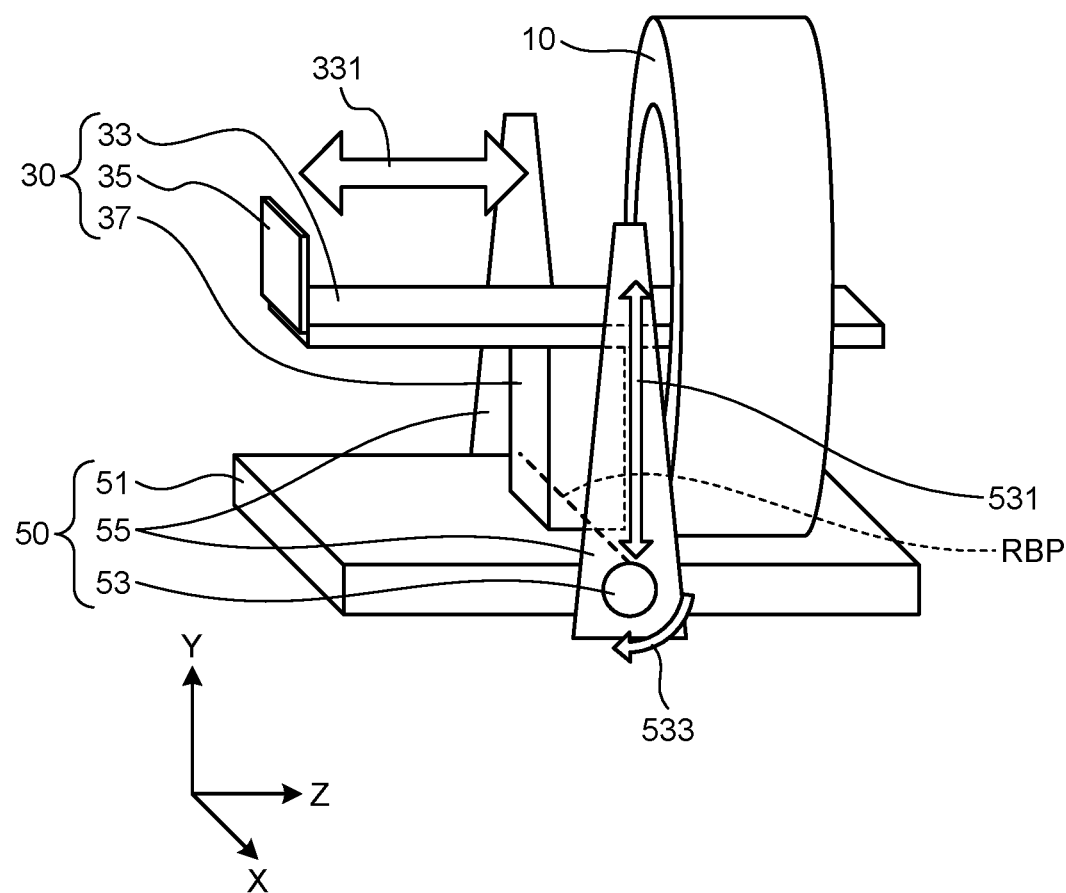
FIG. 8 illustrates an exemplary positional relationship between the gantry apparatus and the subject-support apparatus in decubitus imaging state according to a first modification of the embodiments.
Figure 9:
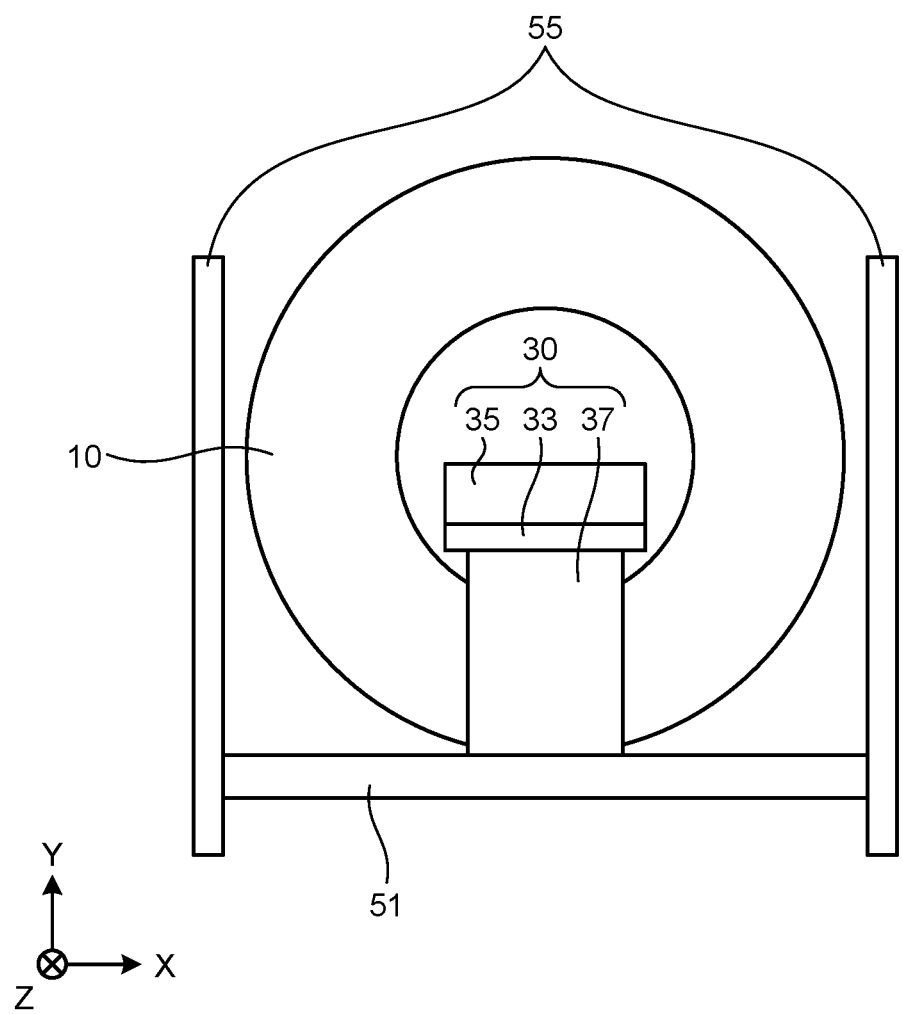
FIG. 9 illustrates another exemplary positional relationship between the gantry apparatus and the subject-support apparatus in decubitus imaging state according to the first modification of the embodiments.

FIG. 8 and FIG. 9 illustrate an exemplary positional relationship between the gantry apparatus 10 and the subject-support apparatus 30 in decubitus imaging state. As illustrated in FIG. 8 and FIG. 9, the support member 37 is fixed, for example, at a reference rotary position RBP between two support stands 55. The position where the support member 37 is fixed to the mount frame 51 is not limited to the reference rotary position RBP, and can be set at any position. The support member 37 corresponds to a base for supporting the support plate 33 (may be referred to as a support base). As illustrated in FIG. 8 and FIG. 9, the support member 37 supports the support plate 33 movably in the longitudinal directions (directions of Z-axis) of the support plate 33, as indicated by an arrows 331 in FIG. 8.

The support plate 33 is provided with a linear motion guide extending in the longitudinal direction (direction of Z-axis). A block movable along the linear motion guide includes the support member 37. The support member 37 supports the support plate 33 movably in the transverse direction of the support plate 33. The support plate 33 is provided with another linear motion guide extending in the transverse direction (direction of X-axis). A block movable along the linear motion guide includes the support member 37. Driven by motors mounted on the blocks under the control of the system control function 441, the support plate 33 moves along the linear motion guides.

The support member 37 supports the support plate 33 movably in the direction perpendicular to the surface of the mount frame 51 (direction of Y-axis). For example, the support member 37 is structured to be extendable in the direction of Y-axis. Such a structure can adopt an appropriate known structure, therefore, an explanation thereof is omitted herein. Due to the features above, the support member 37 can move the support plate 33 in the upright imaging state and in the decubitus imaging state in accordance with instructions of the system control function 441, to move the subject to imaging positions as the user intends to.

The gantry apparatus 10 is fixed to the mount frame 51 adjacent to the support member 37. The position of the gantry apparatus 10 on the mount frame 51 is not limited to the one shown in FIG. 8. The gantry apparatus 10 may be fixed to the mount frame 51 away from the support member 37 or fixed at the reference rotary position RBP between the two support stands 55, for example.

The posture changing process of the first modification omits step S402 and step S405. After step S401, the state-change control function 151 locks the block supporting the support plate 33, the block supporting the table 35, and the gyratory bearing 53 involving the rotation of the support plate 33. Thereby, the motion mechanisms in the subject-support apparatus 30 are locked.

If the mount apparatus 50 is in the decubitus imaging state (Yes in step S404), the state-change control function 151 releases the lock on the block supporting the support plate 33, the block supporting the table 35, and the gyratory bearing 53 involving the rotation of the support plate 33. This places the support plate 33 and the table 35 in a movable state. The rest of the operations are similar to those in the embodiments, therefore, an explanation thereof is omitted herein.

According to the X-ray CT apparatus 1 of the first modification of the embodiments, the gantry 10 and the support member 37 integrated together are mounted on the mount frame 51, and the support member 37 movably supports the support plate 33 in at least one of the longitudinal direction of the support plate 33, the direction perpendicular to the longitudinal direction of the support plate 33 and the rotation axis perpendicular to the vertical direction, and the direction parallel to the rotation axis perpendicular to the vertical direction. The first modification attains similar or same effects as the embodiments, therefore, an explanation thereof is omitted herein.

Second Modification

A second modification differs from the embodiments in that the gyratory bearing 53 is fixed to the support stand 55. Specifically, the support stand 55 rotatably supports the mount frame 51 about the rotation axis being the direction of X-axis via the gyratory bearing 53. Also, the support member 37 supports one end of the support plate 33 movably in the directions of X-axis and Y-axis. In other words, the support member 37 supports one end of the support plate 33 in a cantilever form. The structure and other features of the support member 37 as to the motion of the support plate 33 are similar to those in the embodiments, therefore, an explanation thereof is omitted herein. Further, of the gantry apparatus 10, part of the exterior forming the opening is equipped with a support roller that supports the other end of the support plate 33. The support roller will be described later. An example of the second modification will be described below with reference to FIG. 10 to FIG. 17.

Figure 10:
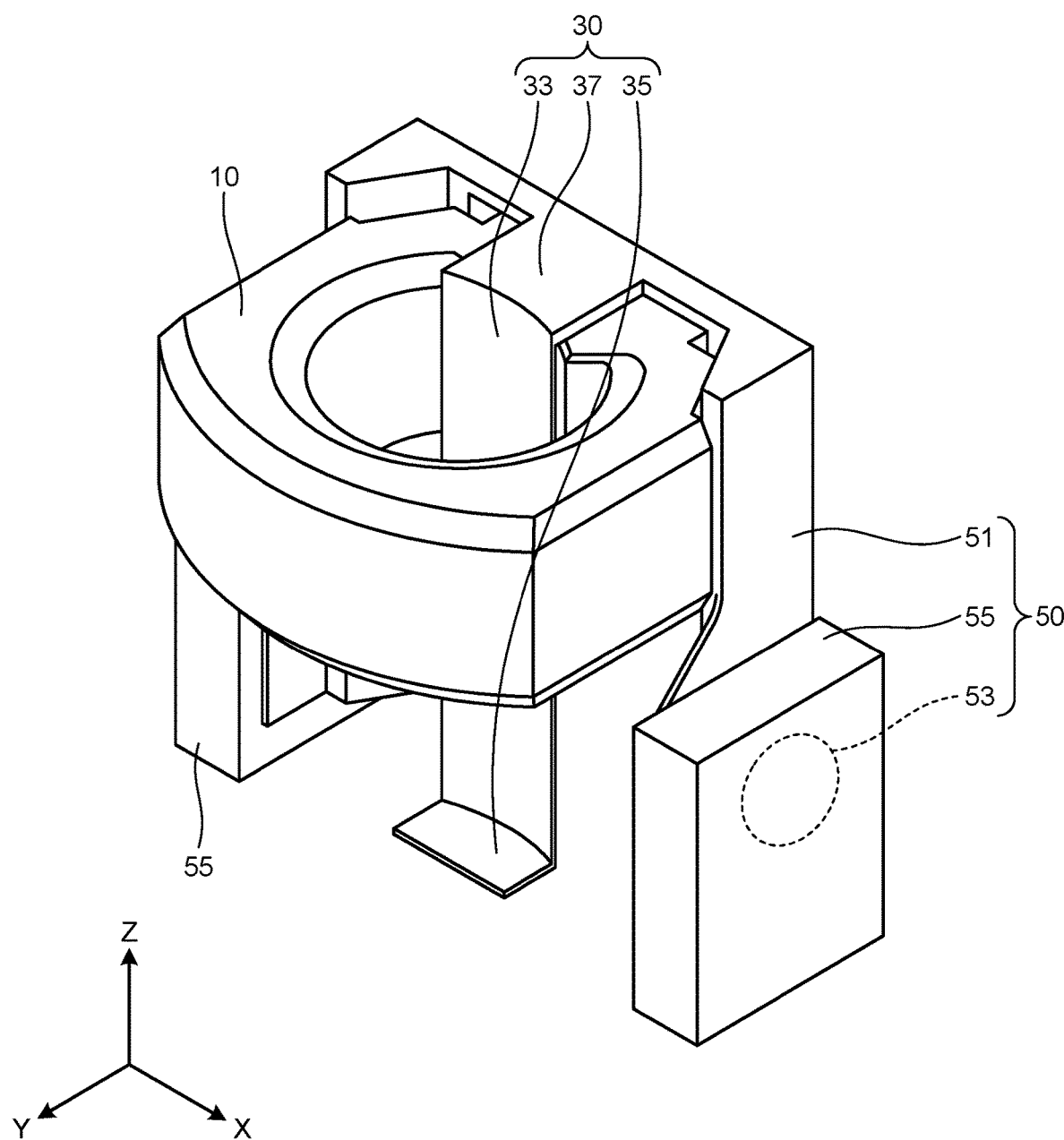
FIG. 10 illustrates an exemplary positional relationship between the gantry apparatus and the subject-support apparatus at the time of capturing the head of a subject in an upright imaging state according to a second modification of the embodiments.

FIG. 10 illustrates an exemplary positional relationship between the gantry apparatus 10 and the subject-support apparatus 30 for capturing the head of the subject in the upright imaging state. In the second modification the support member 37 supports one end of the support plate 33 in a cantilever form as illustrated in FIG. 10. Alternatively, the support member 37 may support both ends of the support plate 33 in the second modification. During imaging, the subject and the support plate 33 are wrapped around with, for example, a body band. In this manner the subject becomes stationary on the support plate 33. The support plate 33 thus supports the subject.

Figure 11:
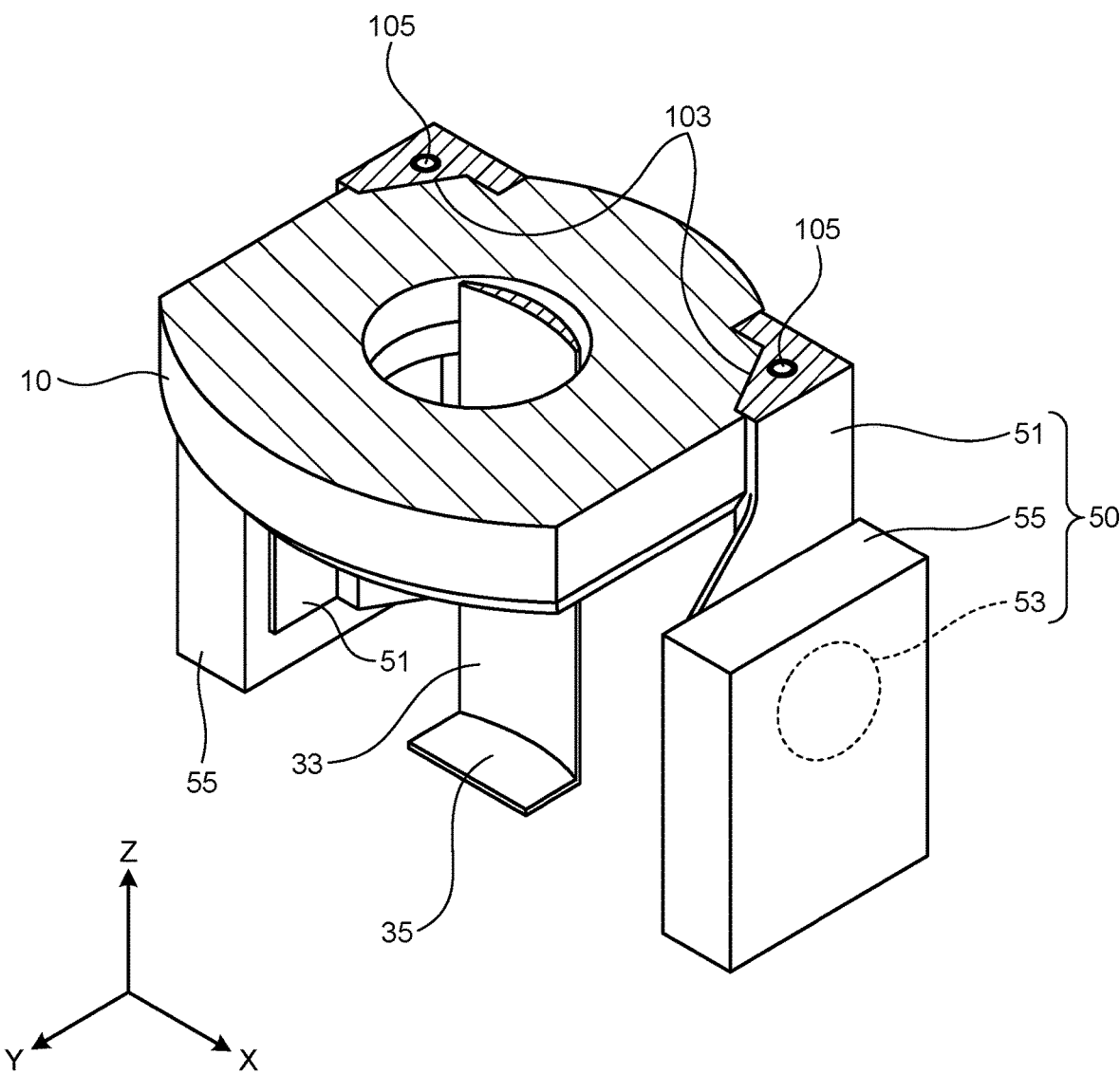
FIG. 11 is a perspective view of an XY cross section of the gantry apparatus and the mount frame of FIG. 10 according to the second modification of the embodiments.

FIG. 11 is a perspective view of an XY cross section of the gantry apparatus 10 and the mount frame 51 in FIG. 10, by way of example. As illustrated in FIG. 11, the gantry apparatus 10 is coupled to the mount frame 51 via a right and left block pair and linear motion guides 103 of the gantry apparatus 10. The blocks are driven via drive shafts 105 to move the gantry apparatus 10 in the direction of Z-axis.

Figure 12:
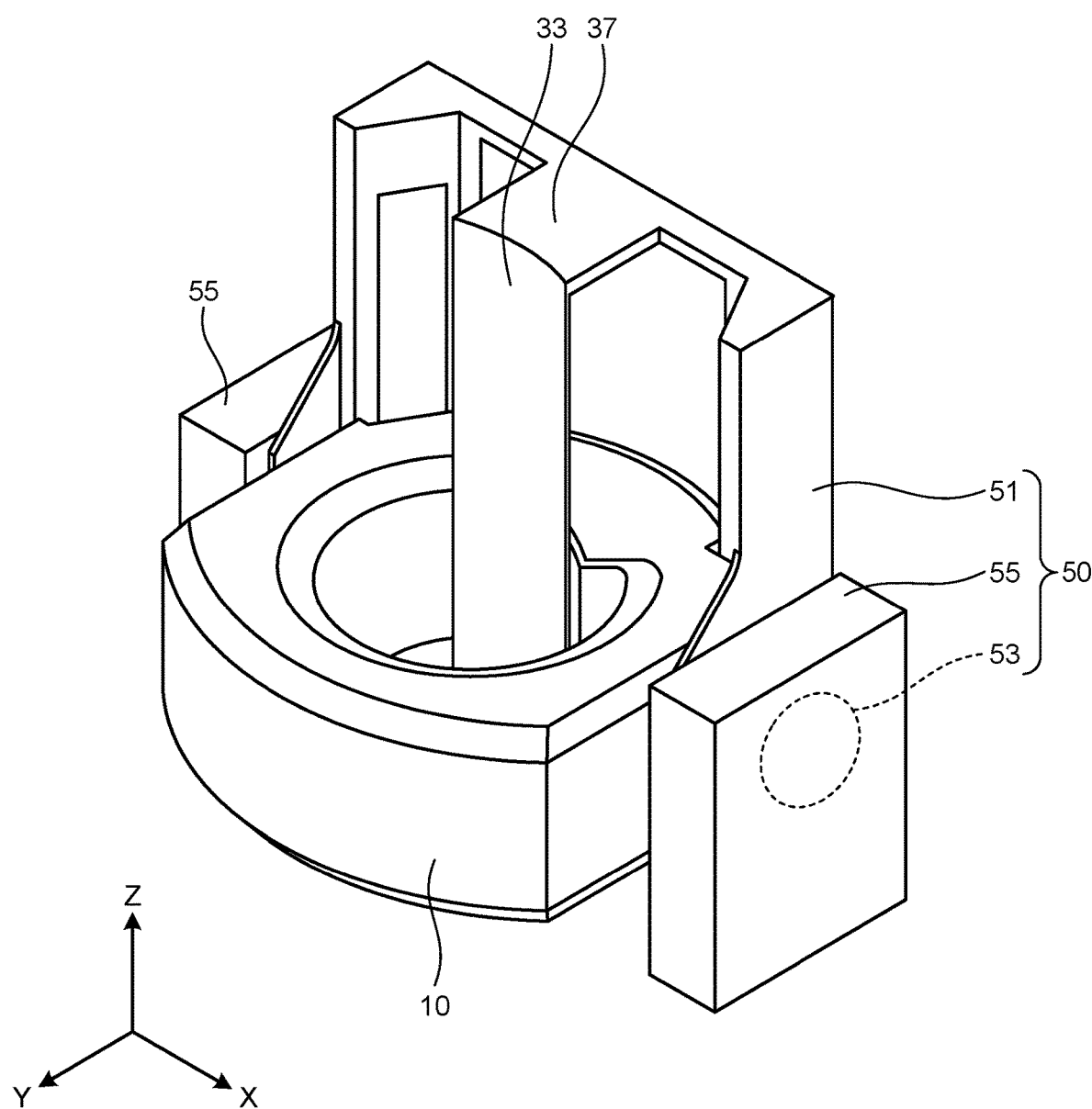
FIG. 12 illustrates an exemplary positional relationship between the gantry apparatus and the subject-support apparatus at the time of capturing the lower limb or limbs of a subject in the upright imaging state according to the second modification of the embodiments.

FIG. 12 illustrates an exemplary positional relationship between the gantry apparatus 10 and the subject-support apparatus 30 for capturing the lower limb or limbs of the subject in the upright imaging state. The difference between FIG. 10 and FIG. 12 is the position of the gantry apparatus 10 in the direction of Z-axis. To image the lower limb or limbs of the subject, the gantry apparatus 10 is moved (descended) to near the table 35.

Figure 13:
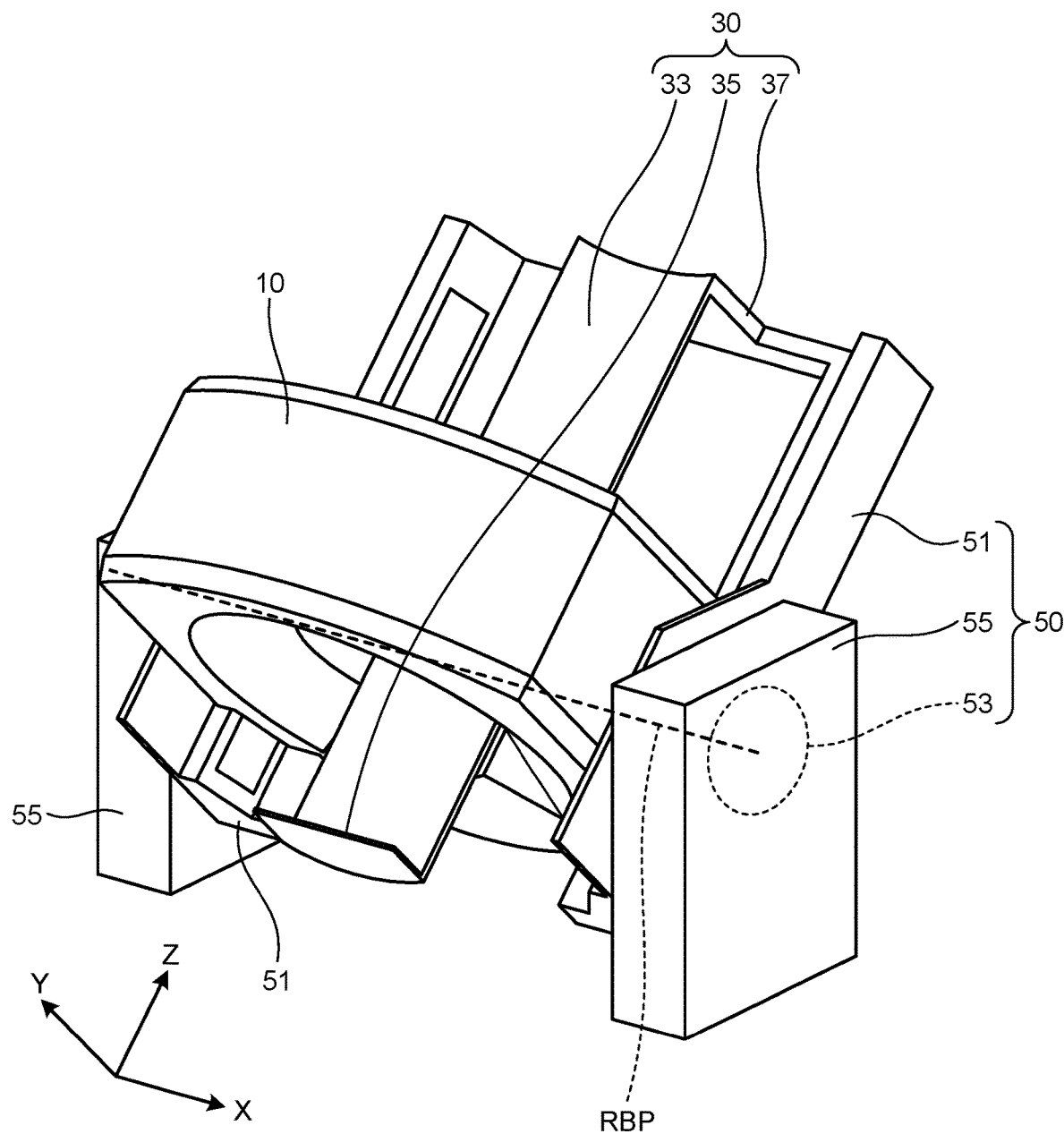
FIG. 13 illustrates an exemplary appearance of the X-ray CT apparatus in the middle of transitioning between the upright imaging state and the decubitus imaging state according to the second modification of the embodiments.

FIG. 13 illustrates an exemplary appearance of the X-ray CT apparatus 1 in the middle of the posture changing process, that is, transitioning between the upright imaging state and the decubitus imaging state. As illustrated in FIG. 13, the mount frame 51 is rotated about the rotation axis being the direction of X-axis via the gyratory bearing 53 after the gantry apparatus 10 is moved to the reference rotary position RBP. The posture changing process of the third modification is similar to that of the first modification, therefore, an explanation thereof is omitted herein.

Figure 14:
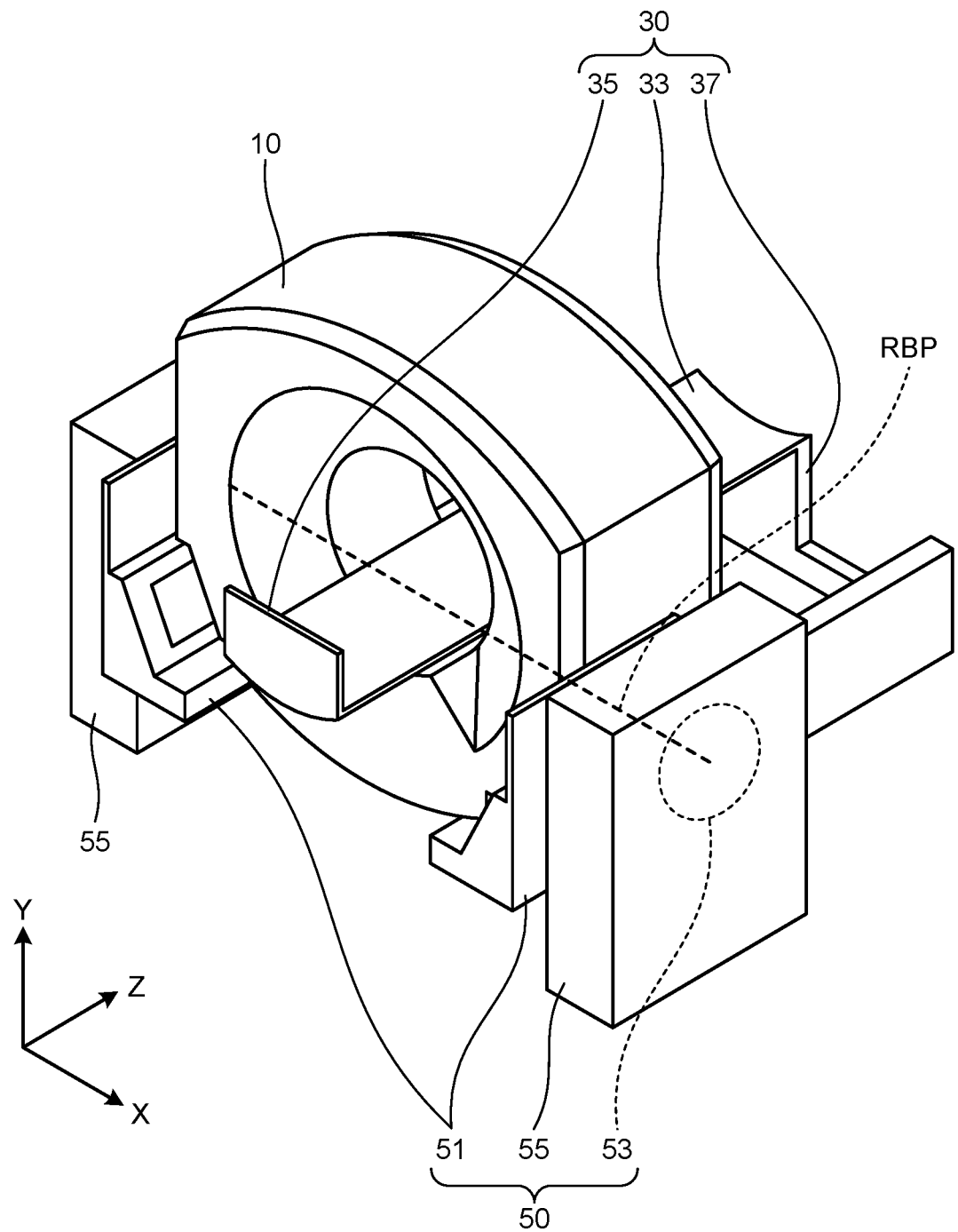
FIG. 14 illustrates a mount apparatus placed in the decubitus imaging state according to the second modification of the embodiments.

FIG. 14 depicts the mount apparatus 50 placed in the decubitus imaging state by way of example. Specifically, FIG. 14 illustrates an exemplary positional relationship between the gantry apparatus 10 and the subject-support apparatus 30 for capturing the abdominal region of the subject in the decubitus imaging state.

Figure 15:
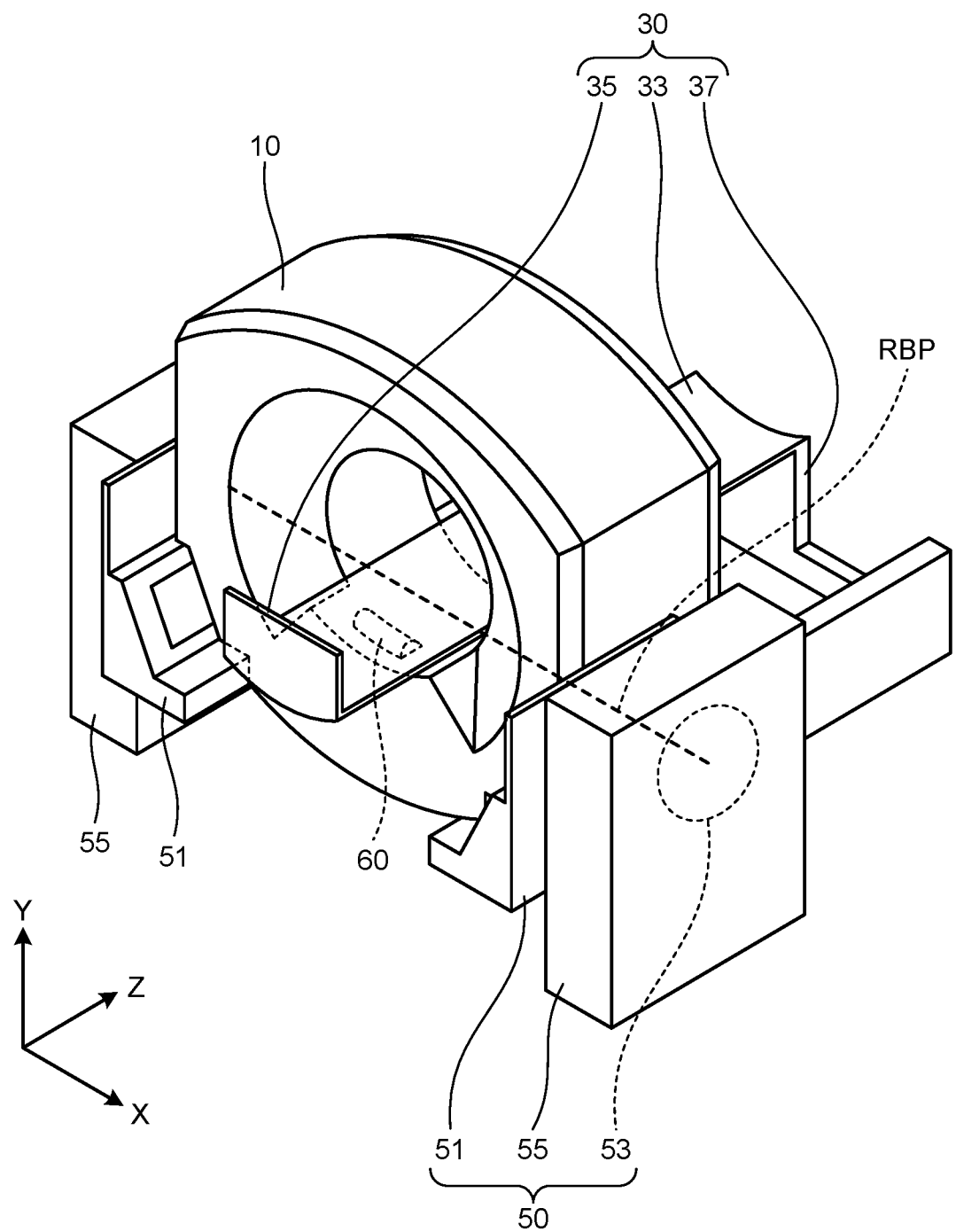
FIG. 15 illustrates an exemplary support roller that supports one end of a support plate according to the second modification of the embodiments.

FIG. 15 illustrates an exemplary support roller 60 that supports the other end of the support plate 33. As illustrated in FIG. 15, the support roller 60 is a rotational member that rotates about the rotation axis being the direction orthogonal to the direction of Z-axis. Further, the support roller 60 corresponds to an intermediate support component for supporting the intermediate part of the support plate 33 to avoid the support plate 33 from sagging, as illustrated in FIG. 15. The distance between the support roller 60 and the support member 37 varies with the Z-axial motion of the gantry apparatus 10 on the mount frame 51.

The support roller 60 may be disposed on the exterior of the gantry apparatus 10 movably in accordance with the motion of the support plate 33 due to the support member 37. The rotation shaft of the support roller 60 is, for example, supported by a motion support mechanism disposed in the exterior of the gantry apparatus 10 near the opening. The motion support mechanism has a structure to freely move the rotation shaft of the support roller 60 in the XY plane. Specifically, the motion support mechanism includes an actuator to move the rotation shaft of the support roller 60 in the direction of Y-axis, a block to move the actuator in the direction of X-axis, and a linear motion guide extending in the direction of X-axis to move the block.

The motor and other components for implementing the operations of the actuator and the block are driven in response to instructions from the control apparatus 15 or the system control function 441. Thereby, the rotation shaft of the support roller 60 is freely movable in the XY plane. One end of the rotation shaft of the support roller 60 may protrude from the XY plane in accordance with the shape of the opening. The structure of the motion support mechanism is not limited to the one described above and can be implemented by a known technique when appropriate.

Figure 16:
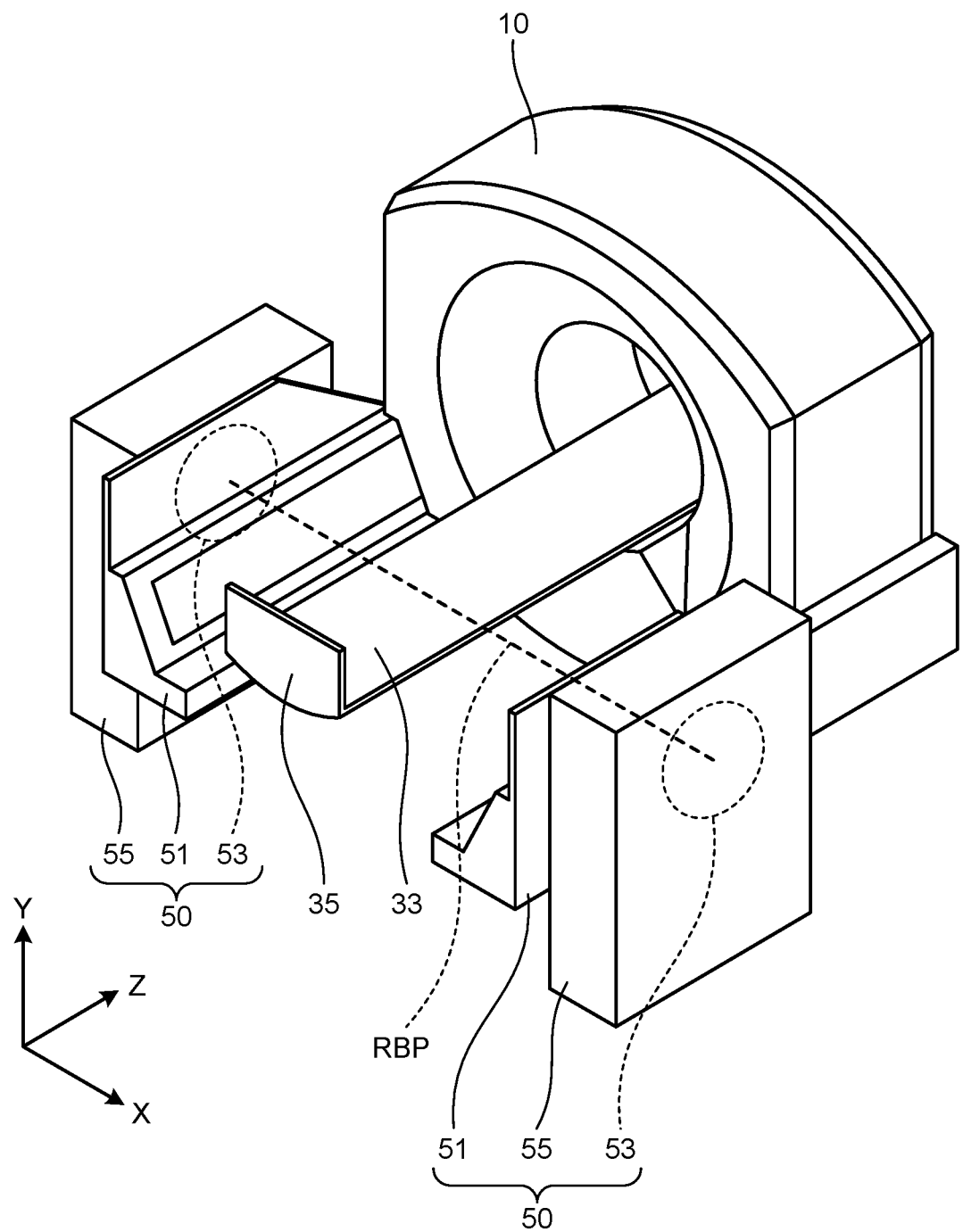
FIG. 16 illustrates an exemplary positional relationship between the gantry apparatus and the subject-support apparatus at the time of capturing the head of a subject in the decubitus imaging state according to the second modification of the embodiments.

FIG. 16 illustrates an exemplary positional relationship between the gantry apparatus 10 and the subject-support apparatus 30 for capturing the head of the subject in the decubitus imaging state. As illustrated in FIG. 16, the gantry apparatus 10 is moved to the support member 37 from the reference rotary position RBP in preparation for imaging the head of the subject.

Figure 17:
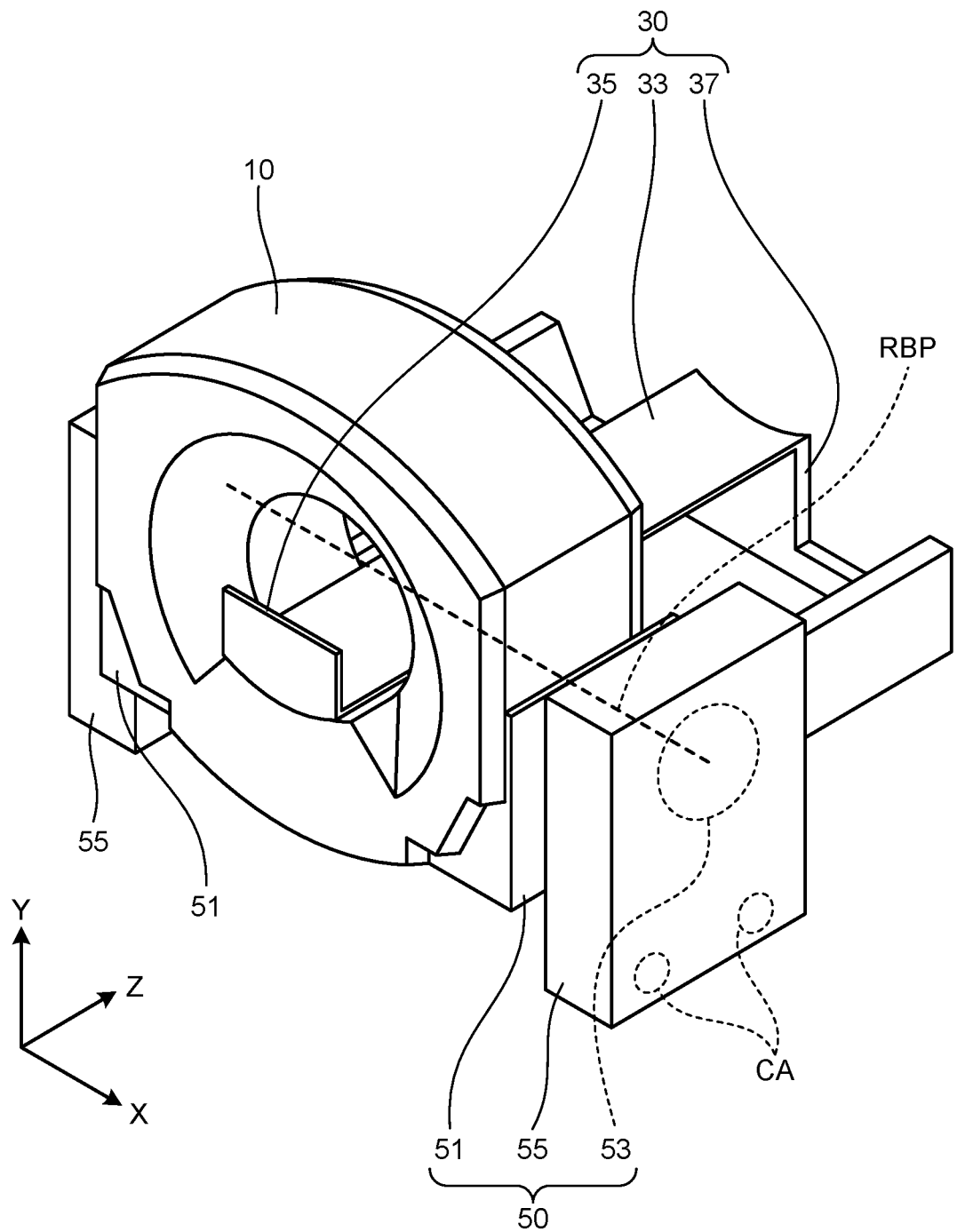
FIG. 17 illustrates an exemplary positional relationship between the gantry apparatus and the subject-support apparatus at the time of capturing the lower limb or limbs of a subject in the decubitus imaging state according to the second modification of the embodiments.

FIG. 17 illustrates an exemplary positional relationship between the gantry apparatus 10 and the subject-support apparatus 30 for capturing the lower limb or limbs of the subject in the decubitus imaging state. As illustrated in FIG. 17, the gantry apparatus 10 is moved to the table 35 from the reference rotary position RBP in preparation for imaging the lower limb or limbs of the subject.

In the X-ray CT apparatus 1 according to the second modification of the embodiments, the support plate 33 is partially disposed in the opening in the exterior of the gantry 10. The X-ray CT apparatus 1 includes the support roller 60 disposed in part of the exterior forming the opening to movably support the support plate 33. Owing to such features, the X-ray CT apparatus 1 of the second modification can reduce sagging of the support plate 33 so that it can implement decubitus imaging and upright imaging with higher positional accuracy between the gantry apparatus 10 and the subject-support apparatus 30. The second modification attains similar or same effects as the embodiments, therefore, an explanation thereof is omitted herein.

Third Modification

The features of a third modification are in that the mount apparatus 50 is portable. For example, the support stand 55 further includes a caster that protrudes from the bottom thereof to the floor. Specifically, at least one caster is provided in a retractable manner at the bottom of the support stand 55. While the mount apparatus 50 is set as shown in FIG. 2, FIG. 3, and FIG. 5 to FIG. 17, a caster CA is retracted into the support stand 55 by a retractive mechanism. Although FIG. 17 depicts the caster CA contained in the support stand 55, the other figures omit showing the caster CA. Alternatively, the caster CA may be put away from the floor while the support stand 55 is set, in place of being contained inside the support stand 55.

The support stand 55 includes the retractive mechanism, a motor, the caster CA, a handle, and a battery. The caster CA includes, for example, a wheel and a gyrator both incorporating a bearing, and stoppers attached to the wheel and the gyrator. A motor for driving the wheel, the retractive mechanism, and the support stand 55 are mounted on the axle of the wheel. In accordance with a manipulation of the handle, the motor is supplied with power from the battery to drive and rotate the caster CA and/or the gyrator.

The retractive mechanism is supplied with power from the battery to retract the caster CA into the support stand 55 and protrude the caster CA from the support stand 55, in accordance with instructions given via the input interface 43, the handle, or an outside input device (not illustrated). Thereby, the caster CA protrudes from the support stand 55 to stand on the floor, to move the support stand 55, and is contained in the support stand 55 while being set. The retractive mechanism that protrudes and retracts the caster CA from and into the support stand 55 can be implemented by any known technique when appropriate, therefore, an explanation thereof is omitted herein.

As illustrated in FIG. 3, FIG. 7 to FIG. 9, FIG. 14, and FIG. 15, while the gantry apparatus 10 is located in the reference rotary position RBP in the decubitus imaging state, the caster CA protrudes from the support stand 55 under the control of the control apparatus 15 in response to receipt of an instruction to move the mount apparatus 50 via the input interface 43, the handle, or an outside input device (not illustrated). At this point the caster CA is locked with the stopper. Along with a user's manipulation of the handle, the caster CA is released from the locked state with the stopper and becomes movable.

In this manner the portability of the X-ray CT apparatus 1 can be implemented. After the mount apparatus 50 is moved, the caster CA is locked with the stopper and retracted into the support stand 55 in response to receipt of an instruction to set the mount apparatus 50 via the input interface 43, the handle, or an outside input device (not illustrated). As such, the moving of the mount apparatus 50 completes. A power supply unit mounted on a separate cart is installed in the vicinity of the mount apparatus 50. The power supply unit is electrically connected to the mount apparatus 50 and a commercial power source. The power supply unit works to convert supplied power from the commercial power source to given power for supply to the mount apparatus 50. This starts charging the battery and places the mount apparatus 50 in a ready state for the posture changing process and places the movable members thereof in an operable state. The gantry apparatus 10 also becomes ready for imaging.

The X-ray CT apparatus 1 of the third modification of the embodiments additionally includes the caster CA that protrudes from the bottom of the support stand 55 to the floor. The caster CA protrudes to the floor to stand on the floor to move the support stand 55 and is contained in the support stand 55 while being set. Thus, the X-ray CT apparatus 1 can be carried in the decubitus imaging state and moved easily. As such, the X-ray CT apparatus 1 can perform upright imaging and decubitus imaging with higher positional accuracy in various locations and the portable X-ray CT apparatus 1 can be improved in operability and examination efficiency. The other effects of the third modification are similar to those of the embodiments, therefore, an explanation thereof is omitted herein.

To implement the technical ideas of the embodiments by a state-change control method, the state-change control method includes moving the gantry 10 onto a rotation axis perpendicular to a vertical direction in the mount frame 51 on which the gantry 10 including an imaging system to image a subject and the support member 3 for supporting the support plate 33 that supports the subject in imaging are mounted; and changing the mount frame in posture at least in-between the vertical direction and the horizontal direction. The procedures and effects of the state-change control method are similar to those of the embodiments, therefore, a description thereof is omitted.

According to at least one of the embodiments and the modifications as above, it is possible to provide decubitus imaging and upright imaging with higher positional accuracy between the gantry 10 and the subject-support apparatus 30.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray computed tomography apparatus, comprising:
   a gantry including an imaging system to image a subject;
   a support member that supports a support plate that supports the subject in imaging;
   a mount frame on which the support member and the gantry are mounted such that a relative positional relationship between the support member and the gantry is changeable in a longitudinal direction of the support plate;
   a support stand that supports the mount frame in a manner that the mount frame is changeable in posture at least in-between a vertical direction and a horizontal direction;
   the mount frame supports the gantry movably in a long axis direction of the mount frame; and
   the support stand supports the mount frame so that the mount frame is changeable in posture at least in between the vertical direction and the horizontal direction by a rotation of the mount frame integrated with the gantry and the support member around a rotation axis.

2. The X-ray computed tomography apparatus according to claim 1, wherein
   the support plate has longitudinal ends and at least one of said longitudinal ends is supported by the support member, and
   the support member supports the support plate movably in at least one of two directions mutually orthogonal to the longitudinal direction.

3. The X-ray computed tomography apparatus according to claim 1, wherein
   the gantry and the support member integrated together are mounted on the mount frame, and
   the support member supports the support plate movably in at least one of the longitudinal direction of the support plate and two directions mutually orthogonal to the longitudinal direction.

4. The X-ray computed tomography apparatus according to claim 1, wherein
   the support stand supports the mount frame movably in the vertical direction.

5. The X-ray computed tomography apparatus according to claim 1, further comprising
   a table on which the subject is to lay a sole or soles of a foot or feet in an upright state or lay buttocks in a seated state.

6. The X-ray computed tomography apparatus according to claim 5, wherein
   the support plate supports the table movably in the longitudinal direction of the support plate.

7. The X-ray computed tomography apparatus according to claim 1, wherein
   the gantry is provided with an opening in which part of the support plate is disposed, and
   the gantry further includes a support roller in part of an exterior forming the opening, the support roller that movably supports the support plate.

8. The X-ray computed tomography apparatus according to claim 1, further comprising:
   a control apparatus configured to rotate the mount frame about a rotation axis perpendicular to the longitudinal direction and the vertical direction in a state transition period from an upright imaging state to a decubitus imaging state, the upright imaging state being a state that the subject is to be imaged in an upright or seated position, the decubitus imaging state being a state that the subject is to be imaged in a decubitus position.

9. The X-ray computed tomography apparatus according to claim 8, wherein
the control apparatus is further configured to move the gantry onto the rotation axis before rotating the mount frame.

10. The X-ray computed tomography apparatus according to claim 8,
the support stand supports the mount frame movably in the vertical direction, and
the control apparatus is further configured to move the mount frame in the vertical direction while rotating the mount frame.

11. The X-ray computed tomography apparatus according to claim 1, wherein
the support stand further comprises a caster that protrudes from a bottom of the support stand to a floor, and
the caster protrudes to the floor to stand on the floor for moving the support stand, and is retracted into the support stand for setting the support stand.

12. The X-ray computed tomography apparatus according to claim 1, wherein,
the mount frame is rotated while the gantry is moved onto the rotation axis.

* * * * *